(12) United States Patent
Zhou et al.

(10) Patent No.: US 12,341,923 B2
(45) Date of Patent: Jun. 24, 2025

(54) SENSOR ADJUSTMENT METHOD AND APPARATUS, AND ELECTRONIC DEVICE

(71) Applicant: Huawei Technologies Co., Ltd., Shenzhen (CN)

(72) Inventors: Yipan Zhou, Shanghai (CN); Ning Qiao, Shanghai (CN); Yi Sui, Shanghai (CN); Jiaqing You, Shanghai (CN); Ping Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 17/919,028

(22) PCT Filed: Apr. 16, 2021

(86) PCT No.: PCT/CN2021/087838
§ 371 (c)(1),
(2) Date: Oct. 14, 2022

(87) PCT Pub. No.: WO2021/209047
PCT Pub. Date: Oct. 21, 2021

(65) Prior Publication Data
US 2023/0239391 A1 Jul. 27, 2023

(30) Foreign Application Priority Data
Apr. 17, 2020 (CN) .......................... 202010307771.0

(51) Int. Cl.
*H04M 1/72454* (2021.01)
*H04M 1/02* (2006.01)
*H04M 1/03* (2006.01)

(52) U.S. Cl.
CPC ..... *H04M 1/72454* (2021.01); *H04M 1/0243* (2013.01); *H04M 1/0268* (2013.01); *H04M 2250/12* (2013.01)

(58) Field of Classification Search
CPC .......... H04M 1/72454; H04M 1/0243; H04M 1/0268; H04M 1/0214; H04M 1/026; H04M 1/725; H04M 2250/12
See application file for complete search history.

(56) References Cited

U.S. PATENT DOCUMENTS

| 2013/0201093 | A1 | 8/2013 | Kim et al. |
| 2014/0015743 | A1* | 1/2014 | Seo .................. G06F 3/017 345/156 |

(Continued)

FOREIGN PATENT DOCUMENTS

| CN | 104115095 A | 10/2014 |
| CN | 105324807 A | 2/2016 |

(Continued)

*Primary Examiner* — Farid Seyedvosoghi
(74) *Attorney, Agent, or Firm* — Conley Rose, P.C.

(57) ABSTRACT

A sensor adjustment method includes obtaining a folding status parameter, where the folding status parameter is used to describe a folding extent of a foldable device, and where a component of the foldable device in a folded state causes interference to a first sensor of the foldable device compared with a non-folded state; invoking a sensor adjustment corresponding to the folding status parameter; and adjusting a sensor operating parameter of the first sensor according to the sensor adjustment and/or performing data preprocessing on first sensor data collected by the first sensor.

20 Claims, 9 Drawing Sheets

(56) References Cited

U.S. PATENT DOCUMENTS

| | | | |
|---|---|---|---|
| 2014/0204024 A1* | 7/2014 | Kim | G06F 1/1694 |
| | | | 345/156 |
| 2014/0375219 A1 | 12/2014 | Lee et al. | |
| 2018/0120954 A1* | 5/2018 | Seo | G06F 3/033 |
| 2020/0265799 A1 | 8/2020 | Choi et al. | |

FOREIGN PATENT DOCUMENTS

| | | | |
|---|---|---|---|
| CN | 106487963 A | 3/2017 | |
| CN | 107368239 A | 11/2017 | |
| CN | 107846515 A | 3/2018 | |
| CN | 109144455 A | 1/2019 | |
| CN | 109871147 A | 6/2019 | |
| JP | 2003125060 A | 4/2003 | |
| JP | 2013007827 A | 1/2013 | |
| KR | 20150043935 A | 4/2015 | |

\* cited by examiner

SENSOR ADJUSTMENT METHOD AND APPARATUS, AND ELECTRONIC DEVICE

CROSS-REFERENCE TO RELATED APPLICATIONS

This application is a U.S. National Stage of International Patent Application No. PCT/CN2021/087838 filed on Apr. 16, 2021, which claims priority to Chinese Patent Application No. 202010307771.0 filed on Apr. 17, 2020, both of which are hereby incorporated by reference in their entireties.

TECHNICAL FIELD

This application relates to the field of intelligent terminal technologies, and in particular, to a sensor adjustment method and apparatus, and an electronic device.

BACKGROUND

A foldable device is a device that can change a shape of the foldable device by folding. The foldable device implements, by changing the shape of the foldable device, a function change (for example, increasing/decreasing a visible region of a screen, changing a screen orientation, or changing a camera orientation), thereby bringing brand new and better user experience. For example, with rapid development of flexible screens, various foldable screen mobile phone products emerge, to obtain a larger screen viewing experience with a smaller mobile phone size.

A mobile terminal device such as a mobile phone is equipped with a plurality of sensors. These sensors work with a sensor response policy designed in software to implement various functions.

However, compared with a non-foldable device, the foldable device has a brand new hardware structure. As a result, a working environment of a sensor on the foldable device is different from a working environment of a sensor on the non-foldable device. If a sensor response policy of the non-foldable device is directly applied to the foldable device, the sensor usually has no response or a response error.

SUMMARY

For a problem that a sensor response policy of a non-foldable device cannot be directly applied to a foldable device, this application provides a sensor adjustment method and apparatus, and an electronic device, and this application further provides a computer-readable storage medium, to provide a manner of adjusting a data collection mode of the foldable device. This avoids a case in which a sensor has no response or a response error due to device folding, and improve user experience of the foldable device.

The following technical solutions are used in embodiments of this application.

According to a first aspect, an embodiment of this application provides a sensor adjustment method, including:

obtaining a folding status parameter, where the folding status parameter is used to describe a folding extent of a foldable device, and a component of the foldable device in a folded state causes first interference to a first sensor of the foldable device compared with that in a non-folded state;

invoking a sensor adjustment policy corresponding to the folding status parameter; and performing an adjustment operation on the first sensor according to the sensor adjustment policy to eliminate impact of the first interference, where the adjustment operation includes: adjusting a sensor operating parameter of the first sensor, and/or performing data preprocessing on first sensor data collected by the first sensor.

The method in the first aspect can eliminate adverse impact caused by device folding of the foldable device on the sensor of the foldable device, ensure that the sensor operates normally, and a sensor response operation corresponding to the sensor data can be correctly implemented. Further, the method in the first aspect can correctly implement the sensor response policy without modifying an existing sensor response policy. This greatly reduces a workload of a developer while ensuring user experience of the foldable device.

In a feasible implementation of the first aspect, before the invoking a sensor adjustment policy corresponding to the folding status parameter, the method further includes:

generating corresponding sensor adjustment policies for different folding status parameters, and including:

determining a data change amount or a data change range caused by the first interference in first sensor data corresponding to the different folding status parameters; and setting the sensor adjustment policy based on the data change amount or the data change range caused by the first interference.

In a feasible implementation of the first aspect, the setting the sensor adjustment policy based on the data change amount or the data change range caused by the first interference includes:

setting the sensor adjustment policy to perform correction calculation on the first sensor data based on the data change amount or the data change range caused by the first interference, to eliminate the data change amount or the data change range caused by the first interference in the first sensor data.

The method in the implementation can implement the correction calculation on the first sensor data according to the sensor adjustment policy. This effectively eliminates the data change amount or the data change range caused by the first interference in the first sensor data.

In a feasible implementation of the first aspect, the setting the sensor adjustment policy based on the data change amount or the data change range caused by the first interference includes:

obtaining a first collected data grading policy for the first sensor in the non-folded state, where the first collected data grading policy includes a first collected data grading threshold;

determining, based on the first collected data grading threshold and the data change amount or the data change range caused by the first interference, second collected data grading thresholds corresponding to the different folding status parameters;

establishing, based on the second collected data grading thresholds corresponding to the different folding status parameters, second collected data grading policies corresponding to the different folding status parameters; and setting the sensor adjustment policy to perform a grading operation on the first sensor data based on the second collected data grading policies, to determine a grade to which the first sensor data belongs.

The method in the implementation can implement grade division for the first sensor data according to the sensor adjustment policy, so that a grade division result under impact of the first interference tends to be consistent with a grade division result when there is no first interference. This can effectively eliminate the data change amount or the data change range caused by the first interference in the first sensor data.

In a feasible implementation of the first aspect, the determining a data change amount or a data change range caused by the first interference in first sensor data corresponding to the different folding status parameters includes:
separately obtaining, for a plurality of different sample environments, first sensor data corresponding to a non-folded state parameter and different folding status parameters in each sample environment;
comparing, for a same sample environment, first sensor data corresponding to a non-folded state parameter and different folding status parameters, to generate a comparison result for the sample environment; and
determining, with reference to the comparison result of each sample environment, the data change amount or the data change range caused by the first interference in first sensor data corresponding to the different folding status parameters.

In a feasible implementation of the first aspect, the determining a data change amount or a data change range caused by the first interference in first sensor data corresponding to the different folding status parameters includes:
parsing out a generation mechanism of the first interference based on a running manner of the first sensor and a folding manner of the foldable device;
generating a first calculation function based on a parsing result of the generation mechanism of the first interference, where a parameter variable of the first calculation function includes the folding status parameter and the data change amount or the data change range caused by the first interference; and
calculating, based on the first calculation function, the data change amount or the data change range caused by the first interference in first sensor data corresponding to the different folding status parameters.

In a feasible implementation of the first aspect, before the invoking a sensor adjustment policy corresponding to the folding status parameter, the method further includes:
generating corresponding sensor adjustment policies for different folding status parameters, and including:
determining a first performance parameter when the first sensor operates normally in the non-folded state;
determining first sensor operating parameters corresponding to the different folding status parameters, where the first sensor maintains the first performance parameter under impact of the first interference based on the first sensor operating parameters; and
setting the sensor adjustment policy to adjust a sensor operating parameter of the first sensor to a first sensor operating parameter corresponding to the folding status parameter.

The method in the implementation can adjust the sensor operating parameter of the sensor according to the sensor adjustment policy, so that the sensor always maintains performance consistent with performance in the non-folded state.

In a feasible implementation of the first aspect, the folding status parameter includes a folding extent grade, different folding extent grades correspond to different folding angle ranges, and the obtaining a folding status parameter includes:
obtaining a current folding angle of the foldable device; and
determining, based on a preset angle range threshold, a folding extent grade to which the current folding angle belongs.

In a feasible implementation of the first aspect, the obtaining a folding status parameter includes:
monitoring a folding status of the foldable device, and determining whether the folding status of the foldable device changes; and
after the folding status of the foldable device changes, obtaining the folding status parameter when the change of the folding status ends.

The implementation obtains the folding status parameter only after the folding status of the foldable device changes. After the folding status parameter is obtained once and before the folding status of the foldable device changes again, the folding status parameter is no longer obtained. In addition, after the folding status of the foldable device changes, the folding status parameter is obtained after the change of the folding status ends. This avoids unnecessary data processing resource consumption caused by frequent obtaining of the folding status parameter.

According to a second aspect, an embodiment of this application proposes a sensor adjustment apparatus for a foldable device, including:
a folding status monitoring module, configured to obtain a folding status parameter, where the folding status parameter is used to describe a folding extent of the foldable device, and a component of the foldable device in a folded state causes first interference to a first sensor of the foldable device compared with that in a non-folded state;
a policy invoking module, configured to invoke a sensor adjustment policy corresponding to the folding status parameter; and
a sensor adjustment module, configured to perform an adjustment operation on the first sensor according to the sensor adjustment policy to eliminate impact of the first interference, where the adjustment operation includes: adjusting a sensor operating parameter of the first sensor, and/or performing data preprocessing on first sensor data collected by the first sensor.

In a feasible implementation of the second aspect, the apparatus further includes:
an adjustment policy generation module, configured to generate corresponding sensor adjustment policies for different folding status parameters, and including:
an interference quantization submodule, configured to determine a data change amount or a data change range caused by the first interference in first sensor data corresponding to the different folding status parameters; and
a sensor adjustment policy setting submodule, configured to set the sensor adjustment policy based on the data change amount or the data change range caused by the first interference.

In a feasible implementation of the second aspect, the sensor adjustment policy setting submodule is configured to set the sensor adjustment policy to perform correction calculation on the first sensor data based on the data change amount or the data change range caused by the first interference, to eliminate the data change amount or the data change range caused by the first interference in the first sensor data.

In a feasible implementation of the second aspect, the sensor adjustment policy setting submodule includes:

a grading policy obtaining unit, configured to obtain a first collected data grading policy for the first sensor in the non-folded state, where the first collected data grading policy includes a first collected data grading threshold;

a grading threshold calculation unit, configured to determine, based on the first collected data grading threshold and the data change amount or the data change range caused by the first interference, second collected data grading thresholds corresponding to the different folding status parameters;

a grading policy setting unit, configured to establish, based on the second collected data grading thresholds corresponding to the different folding status parameters, second collected data grading policies corresponding to the different folding status parameters; and a sensor adjustment policy setting unit, configured to set the sensor adjustment policy to perform a grading operation on the first sensor data based on the second collected data grading policies, to determine a grade to which the first sensor data belongs.

In a feasible implementation of the second aspect, the interference quantization submodule includes:

a sample collection unit, configured to separately obtain, for a plurality of different sample environments, first sensor data corresponding to a non-folded state parameter and different folding status parameters in each sample environment;

a sample comparison unit, configured to compare, for a same sample environment, first sensor data corresponding to a non-folded state parameter and different folding status parameters, to generate a comparison result for the sample environment; and a quantization calculation unit, configured to determine, with reference to the comparison result of each sample environment, the data change amount or the data change range caused by the first interference in the first sensor data corresponding to the different folding status parameters.

In a feasible implementation of the second aspect, the interference quantization submodule includes:

an interference parsing unit, configured to parse out a generation mechanism of the first interference based on a running manner of the first sensor and a folding manner of the foldable device;

a calculation function generation unit, configured to generate a first calculation function based on a parsing result of the generation mechanism of the first interference, where a parameter variable of the first calculation function includes the folding status parameter and the data change amount or the data change range caused by the first interference; and a quantization calculation unit, configured to calculate, based on the first calculation function, the data change amount or the data change range caused by the first interference in the first sensor data corresponding to the different folding status parameters.

In a feasible implementation of the second aspect, the apparatus further includes:

an adjustment policy generation module, configured to generate corresponding sensor adjustment policies for different folding status parameters, and including:

a normal performance determining submodule, configured to determine a first performance parameter when the first sensor operates normally in the non-folded state;

an operating parameter determining submodule, configured to determine first sensor operating parameters corresponding to the different folding status parameters, where the first sensor maintains the first performance parameter under impact of the first interference based on the first sensor operating parameters; and a sensor adjustment policy setting submodule, configured to set the sensor adjustment policy to adjust the sensor operating parameter of the first sensor to a first sensor operating parameter corresponding to the folding status parameter.

In a feasible implementation of the second aspect, the folding status parameter includes a folding extent grade, different folding extent grades correspond to different folding angle ranges, and the folding status monitoring module includes:

an angle obtaining submodule, configured to obtain a current folding angle of the foldable device; and an angle grade determining submodule, configured to determine, based on a preset angle range threshold, a folding extent grade to which the current folding angle belongs.

In a feasible implementation of the second aspect, the folding status monitoring module includes:

a status change monitoring submodule, configured to monitor a folding status of the foldable device, and determine whether the folding status of the foldable device changes; and a folding status obtaining submodule, configured to: after the folding status of the foldable device changes, obtain the folding status parameter when the change of the folding status ends.

According to a third aspect, an embodiment of this application provides an electronic device. The electronic device includes a memory configured to store computer program instructions and a processor configured to execute the program instructions. When the computer program instructions are executed by the processor, the electronic device is triggered to perform the method steps described in embodiments of this application.

According to a fourth aspect, an embodiment of this application provides a computer-readable storage medium. The computer-readable storage medium stores a computer program, and when the computer program is run on a computer, the computer is enabled to perform the method described in embodiments of this application.

DESCRIPTION OF EMBODIMENTS

Figure 1:
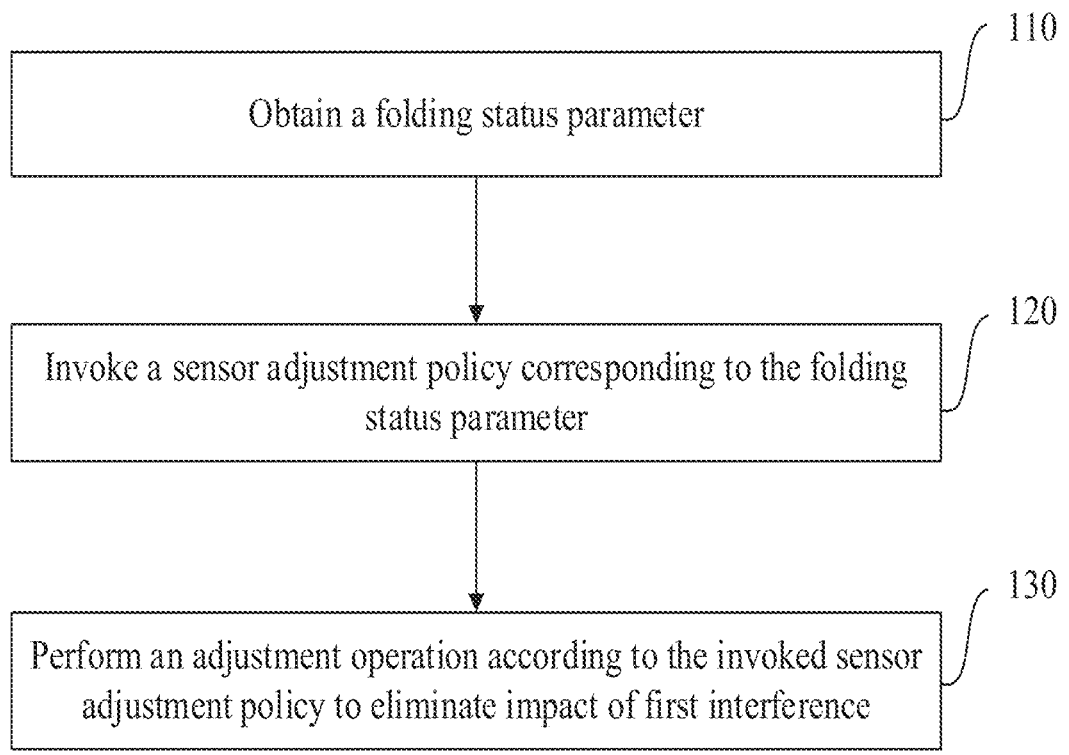
FIG. 1 is a flowchart of an embodiment of a sensor adjustment method for a foldable device according to this application.

To make the objectives, technical solutions, and advantages of this application clearer, the following describes the technical solutions in this application with reference to specific embodiments and accompanying drawings in this application. It is clear that the described embodiments are merely some but not all of embodiments of this application. All other embodiments obtained by a person of ordinary skill in the art based on embodiments of this application without creative efforts shall fall within the protection scope of this application.

Terms used in embodiments of this application are only used to explain specific embodiments of this application, but are not intended to limit this application.

For a problem that a sensor response policy of a non-foldable device cannot be directly applied to a foldable device, embodiments of this application provide a sensor adjustment method. To propose the method in embodiments of this application, the inventor first analyzes a specific reason why the sensor response policy of the non-foldable device cannot be directly applied to the foldable device.

One of obvious hardware differences between the non-foldable device and the foldable device is that relative spatial positions of components of the non-foldable device are fixed, but spatial layouts of components of the foldable device are variable. That is, in a folding process, relative spatial positions of the components of the foldable device change, and after a folding operation ends, different folding extents correspond to different spatial position relationships between the components of the foldable device.

In an actual application scenario, an operating parameter of a sensor is usually set based on an operating environment in which the sensor is located. Without changing the operating parameters, a sensor that operates normally in a working environment may fail to operate normally in another working environment. However, in an application scenario of the foldable device, the relative spatial positions of the components of the foldable device change, which is equivalent to a change in a working environment of a sensor of the foldable device. The sensor may fail to operate normally due to the change. For example, in an application scenario, after the foldable device is entirely unfolded, a sensing window of a first sensor of the foldable device is exposed, and the first sensor can operate normally. However, after the foldable device is entirely folded, the sensing window of the first sensor is blocked by a component of the foldable device, and the first sensor cannot operate normally. As a result, the first sensor has no response.

For the foregoing problems, in an embodiment of this application, a sensor operating parameter of the sensor is correspondingly adjusted based on different folding statuses of the foldable device, so that the sensor can always maintain a normal operating status. In the actual application scenario, the sensor operating parameter of the sensor includes but is not limited to output power, a sampling frequency, a sampling threshold setting, and the like. For example, in an application scenario, the output power of the sensor is adjusted based on the different folding statuses of the foldable device (different degrees of blocking caused to the sensing window of the sensor), to ensure that the sensor can collect data in an external environment of the foldable device.

Further, for most sensors, ambient environment objects within a data collection range of the sensors are used as collection objects. However, not all these collection objects may be target objects, and there are interference items. In this case, data collected by the sensors needs to be processed to filter the interference items. Otherwise, a response error occurs.

In the actual application scenario, some components of the device may also be used as collection targets by the sensor of the device. Therefore, when the sensor is disposed, a collection range of the sensor of the device is usually set to avoid a component of the device that causes interference, or an amount of interference caused by the component of the device to the sensor is predetermined, and data collected by the sensor is filtered in a targeted manner during processing.

However, in the application scenario of the foldable device, when the relative spatial positions of the components of the foldable device change, the components of the foldable device may enter/exit the collection range of the sensor, or may be displaced within the collection range of the sensor. As a result, in the data collected by the sensor, a new interference source that varies with the folding status of the foldable device occurs. Consequently, a sensor response policy that does not consider the interference source cannot be smoothly implemented.

For the foregoing problem, in an embodiment of this application, one of feasible solutions is to change a related processing/response policy or create a processing/response policy for the data collected by the sensor (a processing operation and/or a response operation performed on the data collected by the sensor are/is collectively referred to as a sensor response policy below). However, this increases a workload of a developer. In addition, when a modification/development progress of the sensor response policy lags behind, or a modified sensor response policy or a newly developed sensor response policy has a vulnerability, a sensor function of the foldable device cannot be effectively used. This greatly reduces user experience of the foldable device.

Therefore, in an embodiment of this application, before the data collected by the sensor is processed or responded according to an original sensor response policy (a sensor response policy in which device folding is not considered), data preprocessing is performed on the data collected by the sensor based on the different folding statuses of the foldable device, to eliminate interference generated due to device folding. In this way, the sensor data on which the sensor response policy is implemented does not include the new interference caused by device folding. This can ensure smooth implementation of the sensor response policy without changing the sensor response policy or redeveloping a sensor response policy.

The following describes in detail the technical solutions provided in embodiments of this application with reference to the accompanying drawings.

FIG. 1 is a flowchart of an embodiment of a sensor adjustment method for a foldable device according to this application. In this embodiment of this application, as shown in FIG. 1, the sensor adjustment method for the foldable device includes the following steps.

Step 110: Obtain a folding status parameter, where the folding status parameter is used to describe a folding extent of the foldable device, and a component of the foldable device in a folded state causes first interference to a first sensor of the foldable device compared with that in a non-folded state.

Step 120: Invoke a sensor adjustment policy corresponding to the folding status parameter.

Step 130: Perform an adjustment operation on the first sensor according to the sensor adjustment policy to eliminate impact of the first interference.

Specifically, in step 130, the adjustment operation includes: adjusting a sensor operating parameter of the first sensor, and/or performing data preprocessing on first sensor data collected by the first sensor.

Specifically, in this embodiment of this application, a type of the first sensor is not specifically limited. For example, in this embodiment of this application, the first sensor may be a gravity acceleration sensor, a gyroscope sensor, an earpiece sensor, an ultrasonic sensor, a Hall (Hall) sensor, a distance detection sensor, or the like.

Specifically, in this embodiment of this application, a specific manner of interfering with the first sensor by the first interference and a specific interference degree are determined by a folding manner of the foldable device and an operating manner of the first sensor in an actual application scenario. In this embodiment of this application, the specific manner of interfering with the first sensor by the first interference and the interference degree are not specifically limited.

For example, in this embodiment of this application, the first interference is to hinder the first sensor from operating normally. For another example, in this embodiment of this application, the first interference is to increase an amount of interference to the data collected by the first sensor.

For example, in this embodiment of this application, interference caused by the first interference to the first sensor is constant. That is, when the device is folded in different degrees, an effect of impact caused by the first interference to the first sensor remains unchanged. For another example, in this embodiment of this application, degrees of interference caused by the first interference corresponding to different folding status parameters to the first sensor are different. That is, as a folding extent of the device changes, an effect of impact caused by the first interference to the first sensor also changes.

For example, in this embodiment of this application, the first interference is generated when the device is folded. For another example, in this embodiment of this application, the first interference is generated only when the device is in a specific folding extent status.

Specifically, in this embodiment of this application, the original sensor response policy for the first sensor is not limited. For example, in this embodiment of this application, the original sensor response policy for the first sensor may be setting a detection threshold. When a sensor sensing value in a usage scenario of a user exceeds the preset threshold, a special function is triggered. The special function includes adjusting a device running parameter and the like. Adjusting the device running parameter includes but is not limited to adjusting a radio frequency parameter of a terminal device, for example, transmit power or a sensor threshold parameter.

The method in this embodiment of this application can eliminate adverse impact caused by device folding of the foldable device on the sensor of the foldable device, and ensure that the sensor operates normally, and the sensor response operation for the sensor data can be correctly implemented. Further, the method in this embodiment of this application can correctly implement the sensor response policy without modifying the existing sensor response policy. This greatly reduces a workload of a developer while ensuring user experience of the foldable device.

Specifically, in this embodiment of this application, the folding status parameter includes a folding angle.

Figure 2:
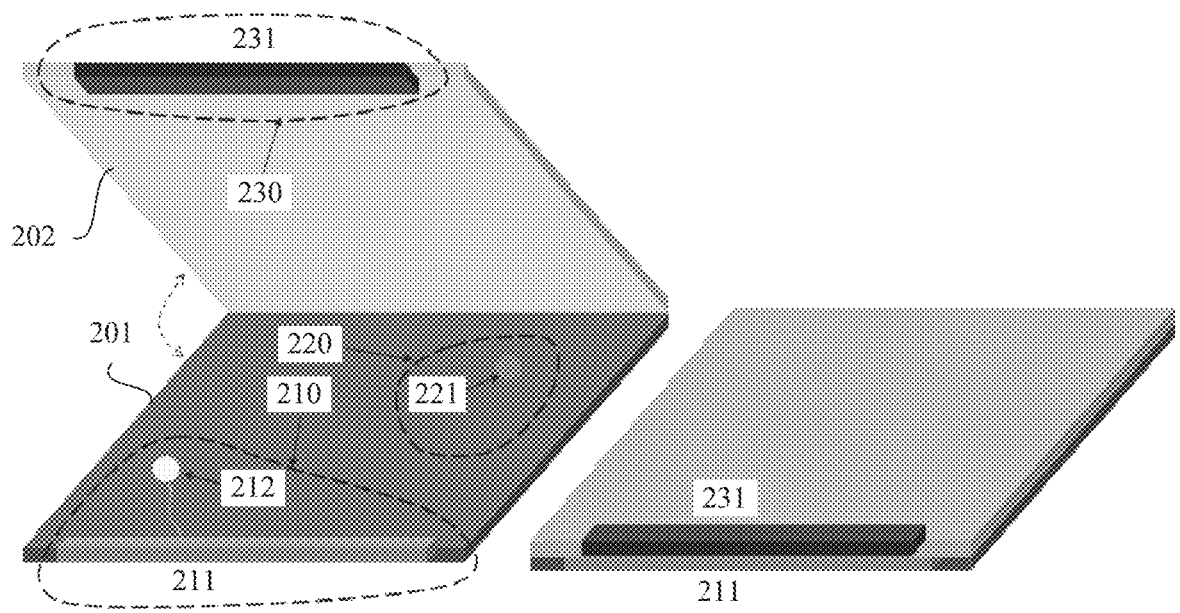
FIG. 2 is a schematic diagram of a foldable device in an embodiment of a sensor adjustment method for the foldable device according to this application.

For example, FIG. 2 is a schematic diagram of the foldable device in this embodiment of the sensor adjustment method for the foldable device according to this application. The left figure in FIG. 2 shows the foldable device in a folded state (a state between a fully folded state and a fully unfolded state). The left figure in FIG. 2 shows the foldable device in the fully folded state.

As shown in FIG. 2, the foldable device includes connected components 201 and 202. The components 201 and 202 may be folded in folding statuses at different angles. The folding angle changes from 0° to 180°, 0° indicates fully folded, and 180° indicates fully unfolded.

Dashed-line boxes 210, 220, and 230 mark three regions on the foldable device.

In the region 210, a sensor 212 is located on the component 201, and the sensor 212 is connected to a component 211 mounted on an edge of the component 201. The component 211 is used as a pole of the sensor 212. The component 211 may be an antenna or another metal structure. The sensor 212 is configured to detect an ambient environment by using the component 211, for example, a change of a distance between an external object and the component 211.

In the region 230, a component 231 is mounted on an edge of the component 202, and the component 231 may be an antenna or another metal or non-metal material. When the foldable device is fully unfolded, it may be considered that the component 231 does not interfere with detection of the sensor 212. However, as the folding angle decreases, the component 231 is closer to the component 211 until the component 231 is attached to the component 211 when the foldable device is fully folded (as shown in the right figure in FIG. 2). In the foregoing folding process, the sensor 212 identifies the component 231 as an external object closer to the component 211, instead of considering the component 231 as a part of the foldable device. As a result, the sensor has a response error. For example, in an application scenario, the sensor response policy is that when the sensor 212 detects that an external object approaches or is near, the sensor 212 automatically wakes up the device or adjusts transmit power of the device. However, when the foldable device is folded (for example, fully folded), the sensor 212 always detects that the external object approaches or is near. However, actually, the sensor 212 detects the component 231, instead of the external object defined in the sensor response policy.

In this case, in this embodiment of this application, a sensor 221 is disposed in the region 220, and the sensor 221 is configured to detect an angle change. The sensor 221 may be a Hall sensor, a gravity acceleration/gyroscope sensor, or the like. There may be one or more sensors 221, and is used to identify a folding angle.

The foldable status of the foldable device is determined based on a recognition result of the sensor 221, a sensor operating parameter of the sensor 212 is correspondingly adjusted, and/or data preprocessing is performed on data collected by the sensor 212, to eliminate interference caused by the component 231 to data collection of the sensor 212.

Further, in an application scenario according to this embodiment of this application, the sensor 221 may be angle sensors in a plurality of forms, one or more sensors 221 may form an angle recognition unit, and there may be one or more recognition angles, which are entirely controlled and designed by a designer in software.

Figure 3:
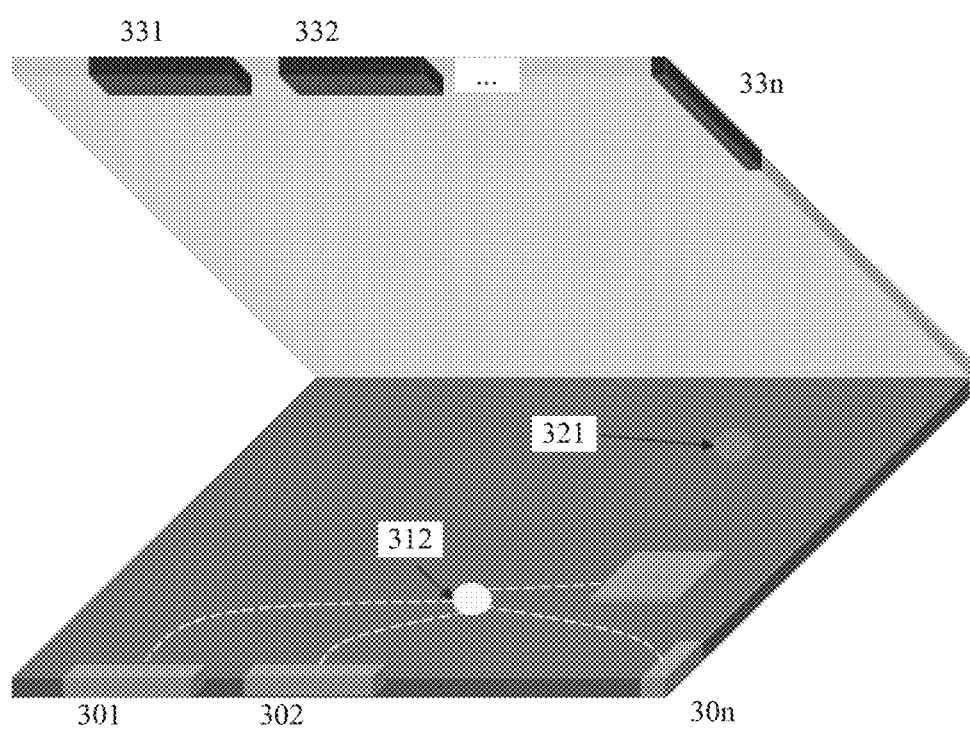
FIG. 3 is a schematic diagram of a foldable device in an embodiment of a sensor adjustment method for the foldable device according to this application.

Specifically, FIG. 3 is a schematic diagram of the foldable device in this embodiment of the sensor adjustment method for the foldable device according to this application. In an application scenario according to this embodiment of this application, as shown in FIG. 3, one sensor 312 may be connected to one or more antenna/electrode components (components 301, 302, . . . , 30n) distributed on a device frame or another position. This may be implemented by using the device frame, an LDS support, or the like. One or more components (components 331, 332, . . . , 33n) that interfere with the antenna/electrode components after the device is folded are distributed on the other components of the device.

A sensor 321 is disposed, and the sensor 321 is configured to detect an angle change. The folding status of the foldable device is determined based on an identification result of the sensor 321, a sensor operating parameter of the sensor 312 is adjusted in response, and/or data preprocessing is performed on data collected by the sensor 312, to eliminate negative impact caused by the interference of the components 331, 332, . . . , 33n to the antenna/electrode components (the components 301, 302, . . . , 30n).

Further, in this embodiment of this application, to reduce a data processing amount and facilitate determining of the folding status of the foldable device, the folding status parameter includes a folding extent grade, where different folding extent grades correspond to different folding angle ranges. A process of obtaining the folding status parameter includes:
  obtaining a current folding angle of the foldable device; and
  determining, based on a preset angle range threshold, a folding extent grade to which the current folding angle belongs.

Specifically, in an application scenario according to this embodiment of this application, as shown in FIG. 2, the sensor 221 is an angle recognition sensor, for example, a Hall sensor or a gravity acceleration/gyroscope sensor. When the foldable terminal device is folded to different angles, the sensor 221 outputs different folding extent grades. One or more angle ranges may be determined, and one or more folding extent grades can be output correspondingly. In an application scenario, as shown in Table 1, there are three states in an example in Table 1, and an angle 1/an angle 2 may be configured through software.

TABLE 1

| Sensor 221 | Angle range | Output folding extent grade |
|---|---|---|
| | Greater than or equal to 0 degrees to less than the angle 1 | Grade 1 |
| | Greater than or equal to the angle 1 to less than the angle 2 | Grade 2 |
| | Greater than or equal to the angle 2 and less than or equal to 180 degrees | Grade 3 |

Further, in this embodiment of this application, to reduce data processing operations, only after the folding status of the foldable device changes, the folding status parameter is obtained and the sensor adjustment policy corresponding to the folding status parameter is invoked. After the folding status parameter is obtained and the corresponding sensor adjustment policy is invoked, before the folding status of the foldable device changes again, the folding status parameter is not obtained and the corresponding sensor adjustment policy is not invoked. This avoids unnecessary data processing resource consumption caused by frequently obtaining the folding status parameter and/or invoking the sensor adjustment policy corresponding to the folding status parameter.

Further, in this embodiment of this application, after the folding status of the foldable device changes, the folding status parameter is obtained after the change of the folding status ends (for example, the folding status does not change within a preset time threshold). This avoids unnecessary data processing resource consumption caused by frequently obtaining the folding status parameter and/or invoking the sensor adjustment policy corresponding to the folding status parameter.

Specifically, in an implementation of step 110 in the embodiment shown in FIG. 1, a process of obtaining the folding status parameter includes:
  monitoring the folding status of the foldable device, and determining whether the folding status of the foldable device changes; and
  after the folding status of the foldable device changes, obtaining the folding status parameter when the change of the folding status ends.

Figure 4:
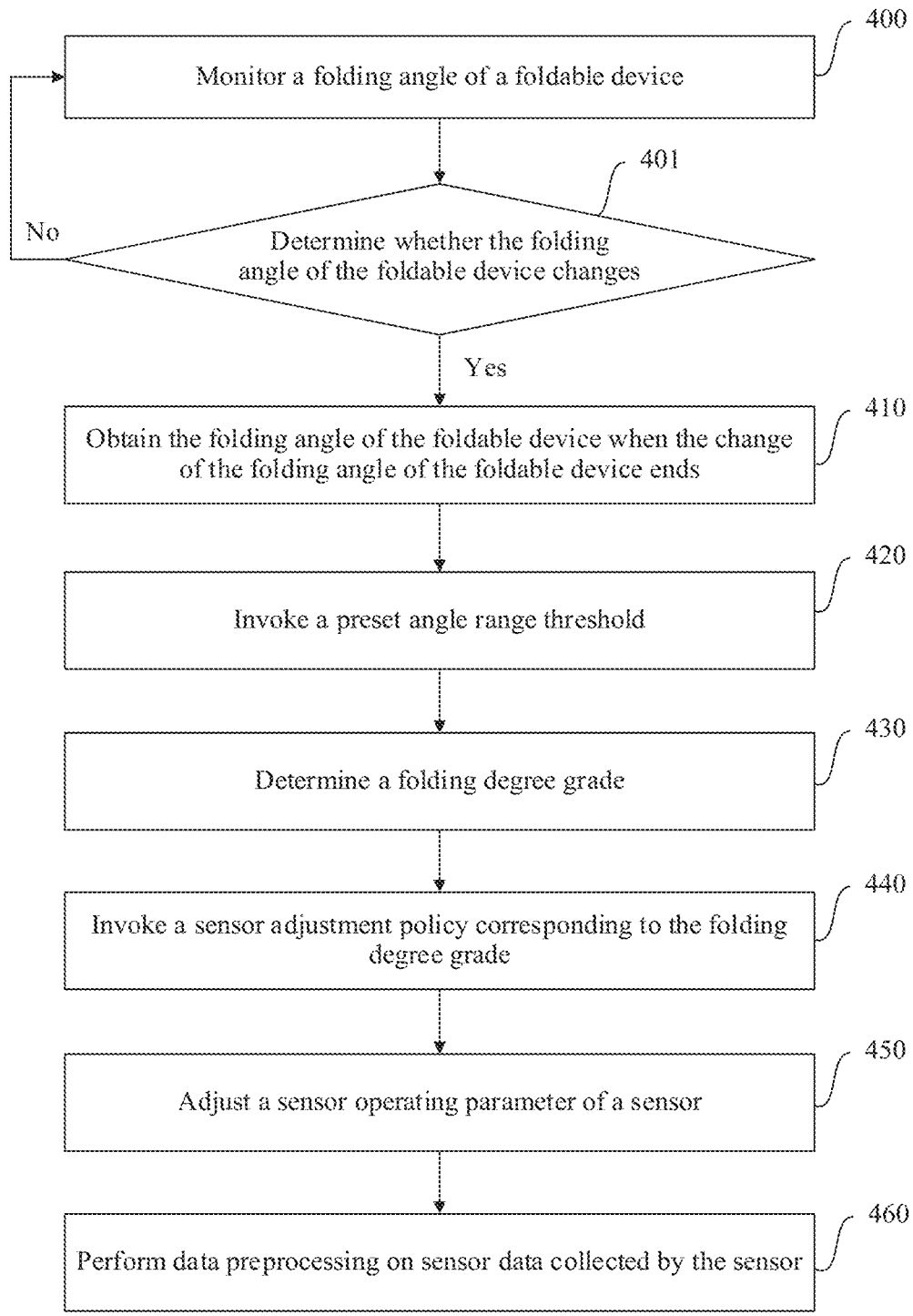
FIG. 4 is a flowchart of an embodiment of a sensor adjustment method for a foldable device according to this application.

Specifically, FIG. 4 is a flowchart of the embodiment of the sensor adjustment method for the foldable device according to this application. In this embodiment of this application, as shown in FIG. 4, the sensor adjustment method includes the following steps.

Step 400: Monitor the folding angle of the foldable device.

Step 401: Determine whether the folding angle of the foldable device changes.

If no change occurs, return to step 400.

Step 410: If the folding angle of the foldable device changes, obtain the folding angle of the foldable device when the change of the folding angle of the foldable device ends.

Step 420: Invoke a preset angle range threshold.

Step 430: Determine a folding extent grade based on the folding angle of the foldable device and the preset angle range threshold.

Step 440: Invoke a corresponding sensor adjustment policy based on the folding extent grade.

Step 450: Adjust the sensor operating parameter of the sensor according to the sensor adjustment policy.

Step 460: Perform, according to the sensor adjustment policy, data preprocessing on the sensor data collected by the sensor.

Further, in this embodiment of this application, a final operating effect of the sensor is determined by an execution effect of step 130. In a process of performing step 130, a key lies in setting of the sensor adjustment policy. Therefore, to improve the execution effect of step 130, in this embodiment of this application, before step 120 is performed, the following steps further need to be performed:
  generating corresponding sensor adjustment policies for different folding status parameters.

Specifically, a data change amount or a data change range caused by the first interference in first sensor data corresponding to the different folding status parameters is first determined, and then the sensor adjustment policy is set based on the data change amount or the data change range caused by the first interference.

Specifically, in an implementation of step 130, data preprocessing is performed on the first sensor data collected by the first sensor. In a process of performing data preprocessing on the sensor data collected by the sensor according to the sensor adjustment policy, data preprocessing is performed in a data correction manner. A data correction process includes: first determining the data change amount or the data change range caused by the first interference generated by folding of the foldable device in the data collected by the sensor; and then performing correction calculation on the sensor data collected by the sensor based on the data change amount or the data change range caused by the first interference, to eliminate the data change amount or the data change range caused by the first interference in the sensor data.

To implement the foregoing data correction process, in the process of generating the corresponding sensor adjustment policies for the different folding status parameters, the corresponding sensor adjustment policy is generated for a data preprocessing manner of data correction.

Figure 5:
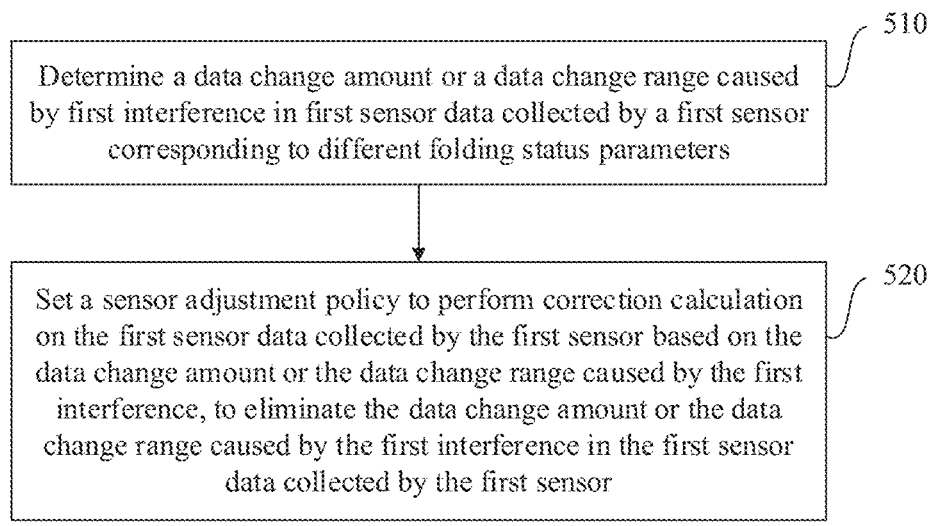
FIG. 5 is a partial flowchart of an embodiment of a sensor adjustment method for a foldable device according to this application.

Specifically, FIG. 5 is a partial flowchart of this embodiment of the sensor adjustment method for the foldable device according to this application. In an embodiment of this application, as shown in FIG. 5, the generating the corresponding sensor adjustment policies for the different folding status parameters includes the following steps.

Step 510: Determine the data change amount or the data change range caused by the first interference in the first sensor data collected by the first sensor corresponding to the different folding status parameters.

Step 520: Set the sensor adjustment policy to perform, based on the data change amount or the data change range caused by the first interference, the correction calculation on the first sensor data collected by the first sensor, to eliminate the data change amount or the data change range caused by the first interference in the first sensor data collected by the first sensor.

Specifically, an application scenario is used as an example. In this application scenario according to this embodiment of this application, as shown in FIG. 2, assuming that the sensor 212 is configured to collect an external environment variable by using the component 211, and external environment variable data collected by the sensor 212 is linearly accumulated with parameters such as a quantity of objects, a distance, and a volume in an external environment.

It is assumed that when the foldable device is fully unfolded, the component 231 does not interfere with the component 211 (which does not affect data collection of the sensor 212). When the foldable device is fully unfolded, and there is no another object in a collectable range of the component 211, a measurement parameter value collected by the sensor 212 is m. When an external object A enters the collectable range of the component 211, and a distance from the external object A to the component 211 is B, a measurement parameter value collected by the sensor 212 is m+b, where b is measurement data corresponding to the external object A.

It is assumed that when the foldable device is fully folded, the component 231 interferes with the component 211 (which affects the data collection of the sensor 212). When the foldable device is fully folded and there is no another object in the collectable range of the component 211, a measurement parameter value collected by the sensor 212 is n, and the measurement parameter value n substantially includes a measurement parameter value for the component 231. In an ideal status, n−m is an amount of interference caused by the component 231 to the sensor 212. In this case, when the foldable device is fully folded, the correction calculation is performed on the data collected by the sensor 212, that is, (n−m) is subtracted from the measurement parameter value collected by the sensor 212.

It is assumed that when the foldable device is fully folded, and when an external object A enters the collectable range of the component 211, and a distance from the component 211 is B, a measurement parameter value collected by the sensor 212 is M, and the correction calculation is performed on the measurement parameter value collected by the sensor 212, that is, M−(n−m). In an ideal status, M−(n−m)=m+b.

It should be noted that obtaining of the amount of interference in the data collected by the sensor 212 is merely a simple example in an ideal application scenario, and does not represent all application scenarios.

According to the method in this embodiment of this application, the correction calculation may be performed on the first sensor data according to the sensor adjustment policy, to effectively eliminate the data change amount or the data change range caused by the first interference in the first sensor data.

Further, in an actual application scenario, in a response policy for the sensor, a corresponding response manner is not set for each different measurement parameter value collected by the sensor, but one or more range thresholds are set, to divide a plurality of sensor measurement parameter grades and set a corresponding response manner for each grade. That is, as long as measurement parameter values collected by the sensor can be divided into correct grades, the sensor response policy can be correctly executed.

Therefore, in this embodiment of this application, in a process of performing, according to the sensor adjustment policy, data preprocessing on the sensor data collected by the sensor, data preprocessing is performed in a manner of dividing grades for the data collected by the sensor, where a grade division mode is kept consistent with a grade division mode in a non-folded state. This eliminates impact of interference caused by device folding in a grade division process.

Figure 6:
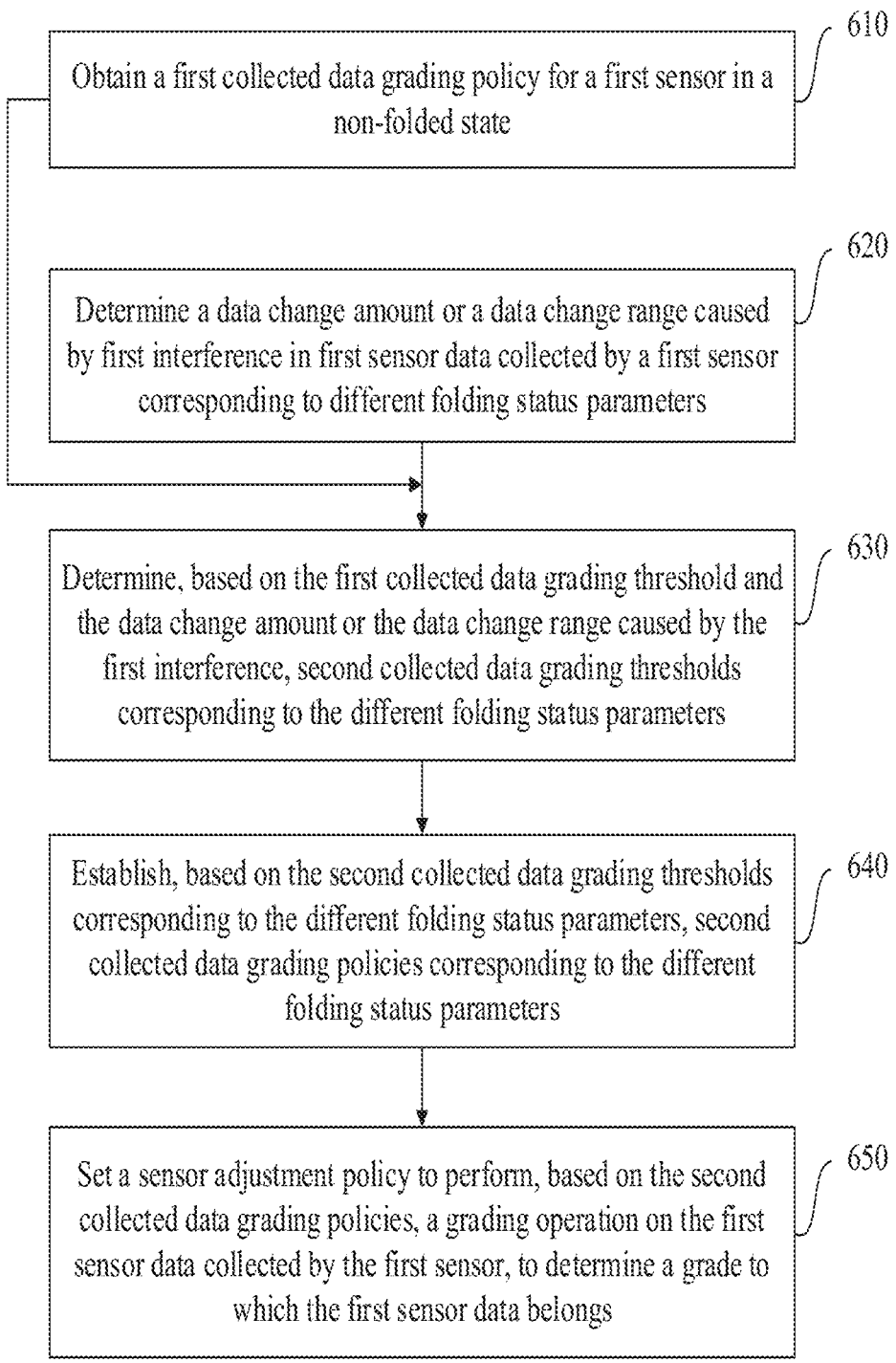
FIG. 6 is a partial flowchart of an embodiment of a sensor adjustment method for a foldable device according to this application.

Specifically. FIG. 6 is a partial flowchart of this embodiment of the sensor adjustment method for the foldable device according to this application. In this embodiment of this application, as shown in FIG. 6, the generating the corresponding sensor adjustment policies for the different folding status parameters includes the following steps.

Step 610: Obtain a first collected data grading policy for the first sensor in the non-folded state, where the first collected data grading policy includes a first collected data grading threshold.

Step 620: Determine the data change amount or the data change range caused by the first interference in the first sensor data collected by the first sensor corresponding to the different folding status parameters.

Step 630: Determine, based on the first collected data grading threshold and the data change amount or the data change range caused by the first interference, second collected data grading thresholds corresponding to the different folding status parameters.

Step 640: Establish, based on the second collected data grading thresholds corresponding to the different folding status parameters, second collected data grading policies corresponding to the different folding status parameters.

Step 650: Set the sensor adjustment policy to perform, based on the second collected data grading policies, a grading operation on the first sensor data collected by the first sensor, to determine a grade to which the first sensor data belongs.

Specifically, an application scenario is used as an example. In an application scenario according to this embodiment of this application, as shown in FIG. 2, assuming that the sensor 212 is configured to collect the external environment variable, and the external environment variable data collected by the sensor 212 is linearly accumulated with the parameters such as the quantity of objects, the distance, and the volume in the external environment.

It is assumed that when the foldable device is fully unfolded, the component 231 does not interfere with the component 211 (which does not affect the data collection of the sensor 212). When the foldable device is fully unfolded, and there is no another object in the collectable range of the component 211, the measurement parameter value collected by the sensor 212 is m. When the foldable device is fully unfolded, and when the measurement parameter value collected by the sensor 212 is less than or equal to m1, a corresponding collection data grade is grade 1. When the measurement parameter value collected by the sensor 212 is greater than m1 and less than or equal to m2, the corresponding collected data grade is a grade 2. When the measurement parameter value collected by the sensor 212 is greater than m2, the corresponding collected data grade is a grade 3.

It is assumed that when the foldable device is fully folded, the component 231 interferes with the component 211 (which affects the data collection of the sensor 212). When the foldable device is fully folded, and there is no another object in the collectable range of the component 211, a measurement parameter value collected by the sensor 212 is n. In an ideal status, n−m is the amount of interference caused by the component 231 to the sensor 212. In this case, when the foldable device is fully folded, and when the measurement parameter value collected by the sensor 212 is less than or equal to m1−(n−m), a corresponding collected data grade is a grade 1. When the measurement parameter value collected by the sensor 212 is greater than m1−(n−m) and less than or equal to m2−(n−m), the corresponding collected data grade is a grade 2. When the measurement parameter value collected by the sensor 212 is greater than m2−(n−m), the corresponding collected data grade is a grade 3.

It should be noted that the grade division policy of the data collected by the sensor 212 is merely a simple example in an ideal application scenario, and does not represent all application scenarios. In this embodiment of this application, a specific process of generating the grade division policy is not limited in detail. In an actual application scenario, a person skilled in the art may divide, based on an actual situation, the grades for the data collected by the sensor, keep a grade division mode consistent with a grade division mode in a non-folded state, and eliminate impact of the first interference in the grade division process.

Specifically, an application scenario is used as an example. In an application scenario according to this embodiment of this application, as shown in FIG. 2, the sensor 212 is connected to the component 211 mounted on the edge of the component 201, to identify a change of an ambient environment of the device. The following uses a distance detection sensor as an example (for example, the sensor 212 may be an infrared distance detection sensor, an ultrasonic sensor, or a capacitive distance detection sensor). The component 211 and the sensor 212 detect changed data in an active or passive detection manner, process the detected data, and divide the data into different grades based on a requirement of the sensor response policy. In Table 2, the component 211 and the sensor 212 detect different raw data (rawdata data), process the rawdata data to form three grades: D1, D2, and D3, and finally perform status division (sensor response) based on the reported grades.

TABLE 2

| Detected data | Grade division | Sensor response |
|---|---|---|
| Rawdata1 | D1 | State A |
| Rawdata2 | D2 | State B |
| Rawdata3 | D3 | State C |

When the device is folded at different degrees, a threshold range for determining a grade to which the rawdata data belongs is different. For example, in the non-folded state, when the rawdata data is Rawdata2, a corresponding grade is D2, and an implemented sensor response corresponds to a state B. In a folded state (for example, fully folded), when the rawdata data is Rawdata2, because the rawdata data includes an amount of interference caused by the component 231, a grade corresponding to Rawdata2 is D1, and the implemented sensor response corresponds to a state A.

According to the method in this embodiment of this application, grade division for the first sensor data can be implemented according to the sensor adjustment policy, so that a grade division result under impact of the first interference tends to be consistent with a grade division result when there is no first interference. This effectively eliminates the data change amount or the data change range caused by the first interference in the first sensor data.

Further, in the foregoing process of generating the sensor adjustment policy, one of key points is to determine the data change amount or the data change range caused by the first interference. To determine the data change amount or the data change range caused by the first interference, in this embodiment of this application, a specific value of the amount of interference is calculated based on an interference principle and based on analysis of a generation mechanism of the amount of interference in the folded state.

Specifically, in this embodiment of this application, determining the data change amount or the data change range caused by the first interference in the first sensor data corresponding to the different folding status parameters includes:

parsing out a generation mechanism of the first interference based on a running manner of the first sensor and a folding manner of the foldable device;

generating a first calculation function based on a parsing result of the generation mechanism of the first interference, where a parameter variable of the first calculation function includes the folding status parameter and the data change amount or the data change range caused by the first interference; and calculating, based on the first calculation function, the data change amount or the data change range caused by the first interference in the first sensor data corresponding to the different folding status parameters.

Specifically, an application scenario is used as an example. In an application scenario according to this embodiment of this application, as shown in FIG. 2, assuming that the sensor 212 is configured to collect the external environment variable, and for an object in a data collection range, the external environment variable data collected by the sensor 212 linearly changes with a distance between the object and the component 211. It is assumed that the change formula is as follows:

$$M = hk \qquad (1)$$

In the formula, M is data detected by the sensor 212, h is the distance between the object and the component 211, and k is a parameter constant.

In the application scenario shown in FIG. 2, when the device is fully unfolded, the component 231 is farthest away from the component 211. As the folding angle continuously decreases, the component 231 gradually approaches the component 211; or when the device is fully folded, the component 231 is closest to the component 211 (the distance is 0). In this case, in an ideal status, the foregoing formula may be used to calculate the amount of interference caused by the component 231 to the sensor 212.

It should be noted that the change formula of the data collected by the sensor 212 is merely a simple example in an ideal application scenario, and does not represent all application scenarios. In this embodiment of this application, a specific process of determining, through interference mechanism analysis, a calculation formula of the data change amount or the data change range caused by the first interference under different folding status parameter conditions is not limited in detail. In an actual application scenario, a person skilled in the art may generate a corresponding calculation formula based on an actual situation.

Further, to determine the data change amount or the data change range caused by the first interference, in this embodiment of this application, sample data of the amount of interference in the folded state is analyzed, and a specific value of the amount of interference is calculated by combining an analysis result of the sample data. Specifically, in this embodiment of this application, determining, in relative to data collected by the first sensor in the non-folded state, a data change amount or a data change range caused by the first interference under the different folding status parameter conditions includes:

separately obtaining, for a plurality of different sample environments, first sensor data corresponding to a non-folded state parameter and different folding status parameters in each sample environment;

comparing, for a same sample environment, first sensor data corresponding to a non-folded state parameter and different folding status parameters, to generate a comparison result for the sample environment; and determining, with reference to the comparison result of each sample environment, the data change amount or the data change range caused by the first interference in the first sensor data corresponding to the different folding status parameters.

Specifically, an application scenario is used as an example. In an application scenario according to this embodiment of this application, as shown in FIG. 2, it is assumed that the sensor 212 is configured to collect the external environment variable.

It is assumed that in a sample environment A1, when the foldable device is fully unfolded, the measurement parameter value collected by the sensor 212 is m1; and when the foldable device is fully folded, the measurement parameter value collected by the sensor 212 is n1. In an ideal status, in the sample environment A1, when the foldable device is fully folded, an amount of interference generated by the component 231 to the component 211 is n1−m1. It is assumed that in a sample environment A2, when the foldable device is fully unfolded, the measurement parameter value collected by the sensor 212 is m2; and when the foldable device is fully folded, the measurement parameter value collected by the sensor 212 is n2. In an ideal status, in the sample environment A2, when the foldable device is fully folded, the amount of interference generated by the component 231 to the component 211 is n2−m2. It is assumed that in a sample environment A3, when the foldable device is fully unfolded, the measurement parameter value collected by the sensor 212 is m3; and when the foldable device is fully folded, the measurement parameter value collected by the sensor 212 is n3. In an ideal status, in the sample environment A1, when the foldable device is fully folded, the amount of interference generated by the component 231 to the component 211 is n3−m3.

Based on data collection results of the sample environments A1, A2, and A3, an average of the three amounts of interference (n1−m1), (n2−m2), and (n3−m3) can be used to determine a value of the amount of interference generated by the component 231 to the component 211 when the foldable device is fully folded.

It should be noted that the amount of interference generated by the component 231 to the component 211 is determined through sample data collection is merely a simple example in an ideal application scenario, and does not represent all application scenarios. In this embodiment of this application, a specific process of determining, through sample analysis, the data change amount or the data change range caused by the first interference under the different folding status parameter conditions is not specifically limited. In an actual application scenario, a person skilled in the art may determine, based on an actual situation, a quantity of sample environments, a quantity of collected sample values, a sample analysis policy, and a comprehensive analysis policy for a plurality of sample environments.

Further, in an implementation of step 130, the sensor operating parameter of the first sensor needs to be adjusted according to the sensor adjustment policy. To adjust the sensor operating parameter of the first sensor, a sensor adjustment policy for adjusting the sensor operating parameter of the first sensor needs to be generated.

Specifically, in step 130, the sensor operating parameter of the sensor is adjusted to ensure that the sensor always maintains performance consistent with performance in the non-folded state. Therefore, in this embodiment of this application, the generating corresponding sensor adjustment policies for different folding status parameters includes:

determining a first performance parameter when the first sensor operates normally in the non-folded state;

determining first sensor operating parameters corresponding to the different folding status parameters, where the first sensor maintains the first performance parameter under impact of the first interference based on the first sensor operating parameters; and setting the sensor adjustment policy to adjust a sensor operating parameter of the first sensor to a first sensor operating parameter corresponding to the folding status parameter.

Specifically, an application scenario is used as an example. In an application scenario according to this embodiment of this application, as shown in FIG. 2, it is assumed that the sensor 212 is configured to transmit a sounding signal by using the component 211, to collect the external environment variable. It is assumed that when the foldable device is fully unfolded, the component 231 does not interfere with the component 211 (which does not affect the data collection of the sensor 212). When the foldable device is fully unfolded, and output power is W1, a detectable range of the sounding signal transmitted by the component 211 by using the component 211 is a.

With device folding, the component 231 is almost blocking the sounding signal transmitted by the component 211. As a result, the detectable range of the sounding signal transmitted by the component 211 shrinks on a premise that the output power remains unchanged. In addition, as the folding angle decreases, interference of the component 231 to the component 211 gradually increases, and the detectable range of the sounding signal transmitted by the component 211 continuously shrinks on a premise that the output power remains unchanged.

Therefore, to maintain the detectable range of the sounding signal transmitted by the component 211, the output power of the sensor 212 is enhanced along with device folding, so that the detectable range of the sounding signal transmitted by the component 211 is maintained as a on a premise that the component 231 blocks the sounding signal transmitted by the component 211.

According to the method in this embodiment of this application, the sensor operating parameter of the sensor can be adjusted according to the sensor adjustment policy, so that the sensor always maintains the performance consistent with the performance in the non-folded state.

It should be noted that the foregoing process of adjusting the sensor operating parameter of the sensor is merely a simple example in an ideal application scenario, and does not represent all application scenarios. In this embodiment of this application, a specific process of determining sensor operating parameters corresponding to the different folding status parameters and specific content included in the sensor operating parameters are not limited in detail. In an actual application scenario, a person skilled in the art may determine, based on an actual situation, the sensor operating parameters corresponding to the different folding status parameters and the specific content included in the sensor operating parameters.

It may be understood that some or all of the steps or operations in the foregoing embodiments are merely examples. In embodiments of this application, other operations or variations of various operations may be further performed. In addition, the steps may be performed in a sequence different from that presented in the foregoing embodiments, and not all operations in the foregoing embodiments may need to be performed.

Figure 7:
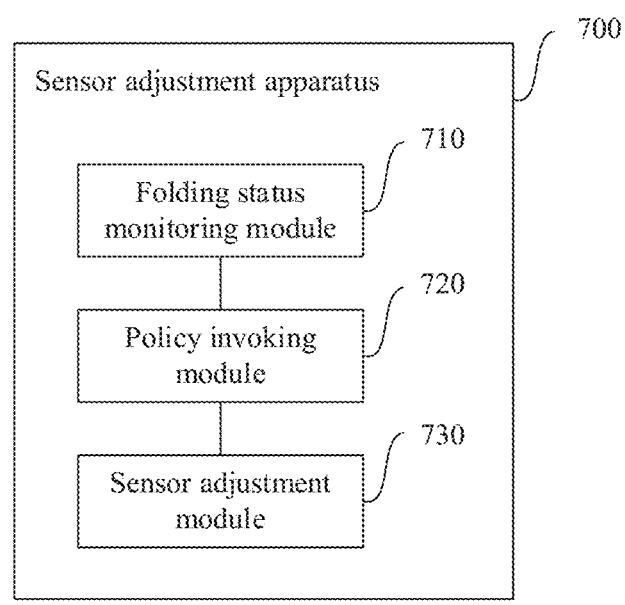
FIG. 7 is a diagram of a structure of an embodiment of a sensor adjustment apparatus according to this application.

Further, based on the sensor adjustment method for the foldable device in embodiments of this application, an embodiment of this application further provides a sensor adjustment apparatus. Specifically, FIG. 7 is a diagram of a structure of this embodiment of the sensor adjustment apparatus according to this application. In this embodiment of this application, as shown in FIG. 7, the sensor adjustment apparatus 700 includes:

a folding status monitoring module 710, configured to obtain a folding status parameter, where the folding status parameter is used to describe a folding extent of a foldable device, and a component of the foldable device in a folded state causes first interference to a first sensor of the foldable device compared with that in a non-folded state;

a policy invoking module 720, configured to invoke a sensor adjustment policy corresponding to the folding status parameter; and a sensor adjustment module 730, configured to perform an adjustment operation on the first sensor according to the sensor adjustment policy to eliminate impact of the first interference, where the adjustment operation includes: adjusting a sensor operating parameter of the first sensor, and/or performing data preprocessing on first sensor data collected by the first sensor.

Further, in this embodiment of this application, the sensor adjustment apparatus for the foldable device further includes:

an adjustment policy generation module, configured to generate corresponding sensor adjustment policies for different folding status parameters, and including:

an interference quantization submodule, configured to determine a data change amount or a data change range caused by the first interference in first sensor data corresponding to the different folding status parameters; and a sensor adjustment policy setting submodule, configured to set the sensor adjustment policy based on the data change amount or the data change range caused by the first interference.

Specifically, in this embodiment of this application, the sensor adjustment policy setting submodule is configured to set the sensor adjustment policy to perform correction calculation on the first sensor data based on the data change amount or the data change range caused by the first interference, to eliminate the data change amount or the data change range caused by the first interference in the first sensor data.

Specifically, in this embodiment of this application, the sensor adjustment policy setting submodule includes:

a grading policy obtaining unit, configured to obtain a first collected data grading policy for the first sensor in the non-folded state, where the first collected data grading policy includes a first collected data grading threshold;

a grading threshold calculation unit, configured to determine, based on the first collected data grading threshold and the data change amount or the data change range caused by the first interference, second collected data grading thresholds corresponding to the different folding status parameters;

a grading policy setting unit, configured to establish, based on the second collected data grading thresholds corresponding to the different folding status parameters, second collected data grading policies corresponding to the different folding status parameters; and a sensor adjustment policy setting unit, configured to set the sensor adjustment policy to perform a grading operation on the first sensor data based on the second collected data grading policies, to determine a grade to which the first sensor data belongs.

Specifically, in this embodiment of this application, the interference quantization submodule in the adjustment policy generation module includes:

a sample collection unit, configured to separately obtain, for a plurality of different sample environments, first sensor data corresponding to a non-folded state parameter and different folding status parameters in each sample environment;

a sample comparison unit, configured to compare, for a same sample environment, first sensor data corresponding to a non-folded state parameter and different folding status parameters, to generate a comparison result for the sample environment; and a quantization calculation unit, configured to determine, with reference to the comparison result of each sample environment, the data change amount or the data change range caused by the first interference in the first sensor data corresponding to the different folding status parameters.

Specifically, in this embodiment of this application, the interference quantization submodule in the adjustment policy generation module includes:

an interference parsing unit, configured to parse out a generation mechanism of the first interference based on a running manner of the first sensor and a folding manner of the foldable device;

a calculation function generation unit, configured to generate a first calculation function based on a parsing result of the generation mechanism of the first interference, where a parameter variable of the first calculation function includes the folding status parameter and the data change amount or the data change range caused by the first interference; and a quantization calculation unit, configured to calculate, based on the first calculation function, the data change amount or the data change range caused by the first interference in the first sensor data corresponding to the different folding status parameters.

Specifically, in this embodiment of this application, the adjustment policy generation module includes:

a normal performance determining submodule, configured to determine a first performance parameter when the first sensor operates normally in the non-folded state;

an operating parameter determining submodule, configured to determine first sensor operating parameters corresponding to the different folding status parameters, where the first sensor maintains the first performance parameter under impact of the first interference based on the first sensor operating parameters; and a sensor adjustment policy setting submodule, configured to set the sensor adjustment policy to adjust the sensor operating parameter of the first sensor to a first sensor operating parameter corresponding to the folding status parameter.

Specifically, in this embodiment of this application, the folding status parameter includes a folding extent grade, different folding extent grades correspond to different folding angle ranges, and the folding status monitoring module includes:

an angle obtaining submodule, configured to obtain a current folding angle of the foldable device; and an angle grade determining submodule, configured to determine, based on a preset angle range threshold, a folding extent grade to which the current folding angle belongs.

Specifically, in this embodiment of this application, the folding status monitoring module includes:

a status change monitoring submodule, configured to monitor a folding status of the foldable device, and determine whether the folding status of the foldable device changes; and a folding status obtaining submodule, configured to: after the folding status of the foldable device changes, obtain the folding status parameter when the change of the folding status ends.

Figure 8:
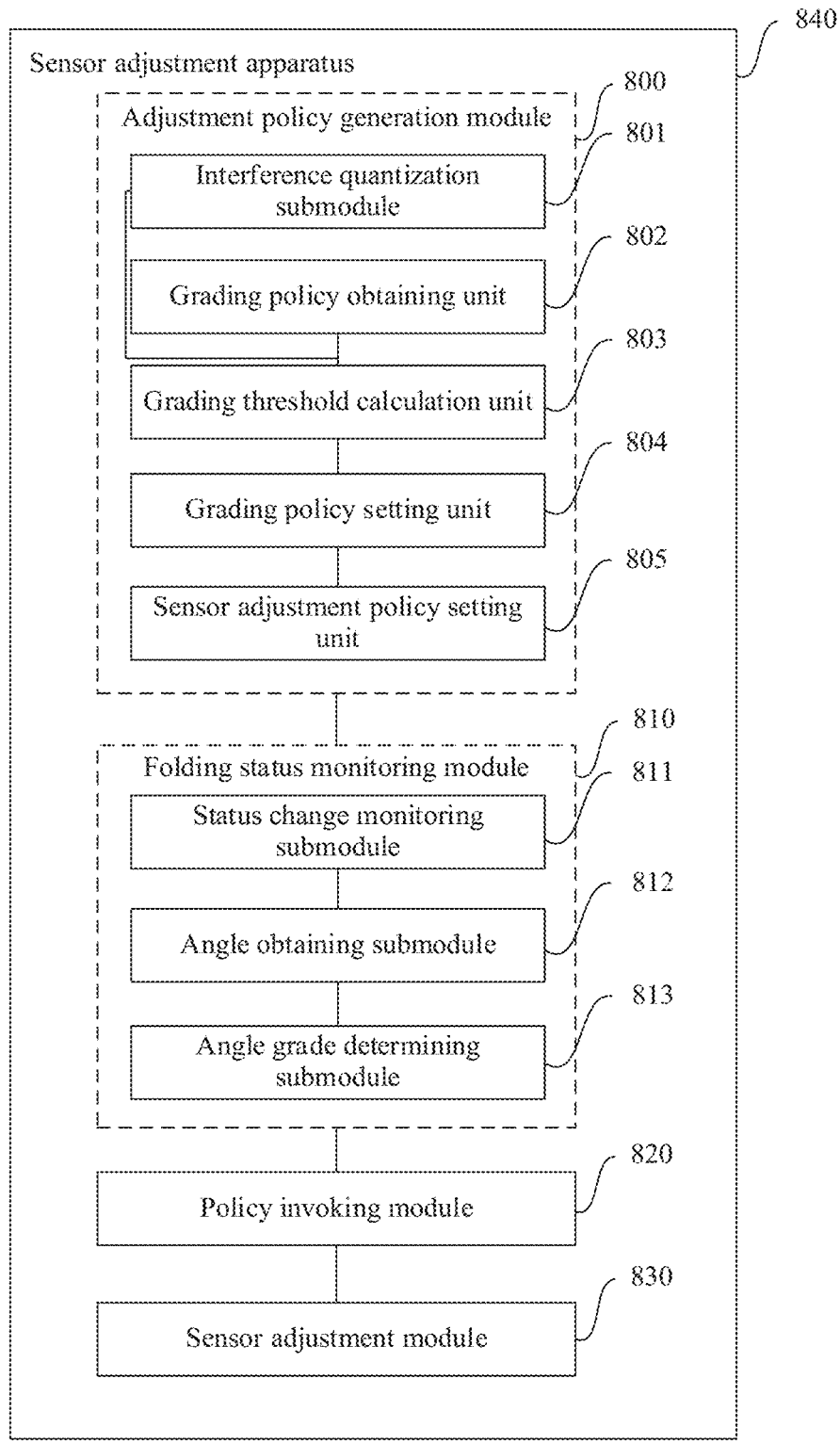
FIG. 8 is a diagram of a structure of an embodiment of a sensor adjustment apparatus according to this application.

Specifically. FIG. 8 is a diagram of a structure of an embodiment of the sensor adjustment apparatus according to this application. In this embodiment of this application, as shown in FIG. 8, the sensor adjustment apparatus 840 includes an adjustment policy generation module 800, a folding status monitoring module 810, a policy invoking module 820, and a sensor adjustment module 830.

The adjustment policy generation module 800 is configured to generate corresponding sensor adjustment policies for different folding status parameters, and including a sensor adjustment policy setting submodule and an interference quantization submodule 802. The interference quantization submodule 802 is configured to determine a data change amount or a data change range caused by first interference in first sensor data corresponding to the different folding status parameters.

The sensor adjustment policy setting submodule includes:

a grading policy obtaining unit 801, configured to obtain a first collected data grading policy for a first sensor in a non-folded state, where the first collected data grading policy includes a first collected data grading threshold:

a grading threshold calculation unit 803, configured to determine, based on the first collected data grading threshold and the data change amount or the data change range caused by the first interference, second collected data grading thresholds corresponding to the different folding status parameters;

a grading policy setting unit 804, configured to establish, based on the second collected data grading thresholds corresponding to the different folding status parameters, second collected data grading policies corresponding to the different folding status parameters; and a sensor adjustment policy setting unit 805, configured to set the sensor adjustment policy to perform a grading operation on the first sensor data based on the second collected data grading policies, to determine a grade to which the first sensor data belongs.

The folding status monitoring module 810 includes:

a status change monitoring submodule 811, configured to monitor a folding status of the foldable device, and determine whether the folding status of the foldable device changes;

an angle obtaining submodule 812, configured to: after the folding status of the foldable device changes, obtain a current folding angle of the foldable device when the change of the folding status ends; and an angle grade determining submodule 813, configured to determine, based on a preset angle range threshold, a folding extent grade to which the current folding angle belongs.

The policy invoking module 820 is configured to invoke a sensor adjustment policy corresponding to the folding extent grade.

The sensor adjustment module 830 is configured to grade, according to the sensor adjustment policy, first sensor data collected by the first sensor under a folding status parameter condition.

Further, in the 1990s, an improvement of a technology may be clearly classified into a hardware improvement (for example, an improvement of a circuit structure such as a diode, a transistor, or a switch) or a software improvement (an improvement of a method process). However, with the development of technologies, improvements in many method processes today can be considered as direct improvements in hardware circuit structures. Design personnel almost all obtain a corresponding hardware circuit structure by programming an improved method process to a hardware circuit. Therefore, an improvement of a method process can be implemented by hardware entity modules. For example, a programmable logic device (Programmable Logic Device, PLD) (for example, a field programmable gate array (Field Programmable Gate Array, FPGA)) is such an integrated circuit, and a logic function of the programmable logic device is determined by an accessing party by programming a device. The design personnel program to "integrate" a digital apparatus into one PLD without a need for a chip manufacturer to design and manufacture an application-specific integrated circuit chip. In addition, today, instead of manually making an integrated circuit chip, such programming is also mostly implemented by using "logic compiler (logic compiler)" software. The "logic compiler" software is similar to a software compiler used during program development and writing, and original code to be compiled is also written in a specific programming language that is referred to as a hardware description language (Hardware Description Language, HDL). The HDL does not have merely one type, but has a plurality of types, such as an ABEL (Advanced Boolean Expression Language), an AHDL (Altera Hardware Description Language), Confluence, a CUPL (Cornell University Programming Language), HDCal, a JHDL (Java Hardware Description Language), Lava. Lola, MyHDL, PALASM, and an RHDL (Ruby Hardware Description Language). Currently, a VHDL (Very-High-Speed Integrated Circuit Hardware Description Language) and Verilog are most commonly used currently. A person skilled in the art should also be aware that, a hardware circuit that implements a logic method process can be easily obtained provided that logic programming is slightly performed on the method process by using the foregoing several hardware description languages and the method process is programmed into an integrated circuit.

A controller may be implemented in any appropriate manner. For example, the controller may take the form of, for example, a microprocessor or a processor, and a computer-readable medium, a logic gate, a switch, an application-specific integrated circuit (Application Specific Integrated Circuit, ASIC), a programmable logic controller, and an embedded microcontroller that stores computer-readable program code (such as software or firmware) that can be executed by the (micro) processor. Examples of the controller include but are not limited to the following microcontrollers: ARC 625D. Atmel AT91SAM, Microchip PIC18F26K20, and Silicone Labs C8051F320. A memory controller may also be implemented as a part of a control logic of a memory. A person skilled in the art also knows that, in addition to implementing the controller in a pure computer-readable program code manner, the controller may implement the same function in a form of a logic gate, a switch, an application-specific integrated circuit, a programmable logic controller, an embedded microcontroller, and the like by performing logic programming on the method steps. Therefore, the controller may be considered as a hardware component, and an apparatus that is included in the controller and that is configured to implement various functions may also be considered as a structure in the hardware component. Alternatively, an apparatus configured to implement various functions may be considered as both a software module for implementing a method and a structure in a hardware component.

In the description of embodiments of this application, for ease of description, the apparatus is described through function division into various modules/units. Division into the modules/units is merely division of logical functions. During implementation of embodiments of this application, functions of the modules/units may be implemented in one or more pieces of software and/or hardware.

Specifically, in an actual implementation, all or some of the apparatuses provided in embodiments of this application may be integrated into one physical entity, or may be physically separated. In addition, all of the modules may be implemented in a form of software invoked by a processing element or in a form of hardware. Alternatively, some of the modules may be implemented in a form of software invoked by a processing element, and some modules may be implemented in a form of hardware. For example, a detection module may be a separately disposed processing element, or may be integrated into a chip of an electronic device for implementation. An implementation of another module is similar to the implementation of the detection module. In addition, all or some of these modules may be integrated together, or may be implemented independently. In an implementation process, steps in the foregoing methods or the foregoing modules can be implemented by using a hardware integrated logical circuit in the processing element, or by using instructions in a form of software.

For example, the foregoing modules may be configured as one or more integrated circuits that implement the foregoing method, such as one or more application-specific integrated circuits (Application Specific Integrated Circuit, ASIC), one or more microprocessors (Digital Signal Processor, DSP), one or more field programmable gate arrays (Field Programmable Gate Arrays, FPGAs), or the like. For another example, the modules may be integrated together and implemented in a form of a system-on-a-chip (System-On-a-Chip, SOC).

An embodiment of this application further proposes an electronic device. The electronic device includes a memory configured to store computer program instructions and a processor configured to execute the program instructions. When the computer program instructions are executed by the processor, the electronic device is triggered to perform the following steps:
  obtaining a folding status parameter, where the folding status parameter is used to describe a folding extent of a foldable device, and a component of the foldable device in a folded state causes first interference to a first sensor of the foldable device compared with that in a non-folded state;
  invoking a sensor adjustment policy corresponding to the folding status parameter; and
  adjusting a sensor operating parameter of the first sensor according to the sensor adjustment policy, and/or performing data preprocessing on first sensor data collected by the first sensor to eliminate impact of the first interference.

In this embodiment of this application, when the instructions are executed by the device, before the device invokes the sensor adjustment policy corresponding to the folding status parameter, the device is enabled to perform the following steps:
  generating corresponding sensor adjustment policies for different folding status parameters, and including:
  determining a data change amount or a data change range caused by the first interference in first sensor data corresponding to the different folding status parameters; and
  setting the sensor adjustment policy to perform correction calculation on the first sensor data based on the data change amount or the data change range caused by the first interference, to eliminate the data change amount or the data change range caused by the first interference in the first sensor data.

In this embodiment of this application, when the instructions are executed by the device, before the device invokes the sensor adjustment policy corresponding to the folding status parameter, the device is enabled to perform the following steps:
  generating corresponding sensor adjustment policies for different folding status parameters, and including:
  obtaining a first collected data grading policy for the first sensor in the non-folded state, where the first collected data grading policy includes a first collected data grading threshold;

determining the data change amount or the data change range caused by the first interference in the first sensor data corresponding to the different folding status parameters;

determining, based on the first collected data grading threshold and the data change amount or the data change range caused by the first interference, second collected data grading thresholds corresponding to the different folding status parameters;

establishing, based on the second collected data grading thresholds corresponding to the different folding status parameters, second collected data grading policies corresponding to the different folding status parameters; and setting the sensor adjustment policy to perform a grading operation on the first sensor data based on the second collected data grading policies, to determine a grade to which the first sensor data belongs.

In this embodiment of this application, when the instructions are executed by the device, the device is enabled to perform the step of determining the data change amount or the data change range caused by the first interference in the first sensor data corresponding to the different folding status parameters, including:

separately obtaining, for a plurality of different sample environments, first sensor data corresponding to a non-folded state parameter and different folding status parameters in each sample environment;

comparing, for a same sample environment, first sensor data corresponding to a non-folded state parameter and different folding status parameters, to generate a comparison result for the sample environment; and determining, with reference to the comparison result of each sample environment, the data change amount or the data change range caused by the first interference in the first sensor data corresponding to the different folding status parameters.

In this embodiment of this application, when the instructions are executed by the device, the device is enabled to perform the step of determining the data change amount or the data change range caused by the first interference in the first sensor data corresponding to the different folding status parameters, including:

parsing out a generation mechanism of the first interference based on a running manner of the first sensor and a folding manner of the foldable device;

generating a first calculation function based on a parsing result of the generation mechanism of the first interference, where a parameter variable of the first calculation function includes the folding status parameter and the data change amount or the data change range caused by the first interference; and calculating, based on the first calculation function, the data change amount or the data change range caused by the first interference in the first sensor data corresponding to the different folding status parameters.

In this embodiment of this application, when the instructions are executed by the device, before the device invokes the sensor adjustment policy corresponding to the folding status parameter, the device is enabled to perform the following steps:

generating corresponding sensor adjustment policies for different folding status parameters, and including:

determining a first performance parameter when the first sensor operates normally in the non-folded state;

determining first sensor operating parameters corresponding to the different folding status parameters, where the first sensor maintains the first performance parameter under impact of the first interference based on the first sensor operating parameters; and setting the sensor adjustment policy to adjust a sensor operating parameter of the first sensor to a first sensor operating parameter corresponding to the folding status parameter.

In this embodiment of this application, the folding status parameter includes a folding extent grade, and different folding extent grades correspond to different folding angle ranges. When the instructions are executed by the device, the device is enabled to perform the step of obtaining the folding status parameter, including:

obtaining a current folding angle of the foldable device; and determining, based on a preset angle range threshold, a folding extent grade to which the current folding angle belongs.

In this embodiment of this application, when the instructions are executed by the device, the device is enabled to perform the step of obtaining the folding status parameter, including:

monitoring the folding status of the foldable device, and determining whether the folding status of the foldable device changes; and after the folding status of the foldable device changes, obtaining the folding status parameter when the change of the folding status ends.

The device, apparatus, modules or units described in embodiments of this application may be specifically implemented by a computer chip or an entity, or may be implemented by a product having a function. A typical implementation device is a computer, for example, may be a desktop computer, a notebook computer, a tablet computer, a mobile phone, a personal digital assistant, a media player, a navigation device, a game console, a wearable device, or a combination of any of these devices.

Specifically, in an embodiment of this application, the electronic device may be a device such as a mobile terminal (a mobile phone, a tablet computer, or a notebook computer), a local terminal (a personal/industrial computer), or a cloud server. The one or more computer programs are stored in the memory, the one or more computer programs include instructions, and when the instructions are executed by the device, the device is enabled to perform the method steps in embodiments of this application.

Further, the electronic device shown in an embodiment of this application may be a terminal device, or may be a circuit device built in the foregoing terminal device. The device may be configured to perform the functions/steps in the method provided in embodiments in this application.

Specifically, in an embodiment of this application, the processor of the electronic device may be a system-on-a-chip SOC, and the processor may include a central processing unit (Central Processing Unit, CPU), or may further include a processor of another type.

Specifically, in an embodiment of this application, the processor may include, for example, a CPU, a DSP, and a microcontroller, and may further include an application processor (Application Processor, AP), a graphics processing unit (Graphics Processing Unit, GPU), an embedded neural-network processing unit (Neural-network Process Unit, NPU), an image signal processor (Image Signal Processing, ISP), a modem processor, a video codec, a baseband processor, and a pulse width modulation (Pulse width modulation, PWM) controller.

The processor may further include a necessary hardware accelerator or logic processing hardware circuit, for example, an ASIC, or one or more integrated circuits configured to control program execution in the technical solutions of this application. In addition, the processor may have a function of operating one or more software programs. The software program may be stored in a storage medium.

Specifically, in an embodiment of this application, the memory includes a permanent computer-readable medium, a non-permanent computer-readable medium, a removable computer-readable medium, and a non-removable computer-readable medium that may implement information storage by using any method or technology. Information stored in the computer-readable medium of the memory may be computer-readable instructions, a data structure, a module of a program, or other data.

Examples of computer-readable medium include but are not limited to: a read-only memory (Read-Only Memory, ROM), another type of static storage device that can store static information and instructions, a random access memory (Random Access Memory. RAM), an electrically erasable programmable read-only memory (Electrically Erasable Programmable Read-Only Memory, EEPROM), a phase-change random access memory (PRAM), a static random access memory (SRAM), a dynamic random access memory (DRAM), a flash memory, or a memory of another memory technology, a compact disc read-only memory (Compact Disc Read-Only Memory, CD-ROM), any medium that can store program code and can be accessed by a computing device, such as a digital versatile disc (DVD) or another optical storage (including a compact disc, a laser disc, an optical disc, a digital versatile disc, a Blu-ray disc, and the like), a cartridge magnetic tape, a magnetic tape magnetic disk storage or another magnetic storage device, or any other non-transmission medium.

Specifically, in an embodiment of this application, the processor and the memory may be integrated into one processing apparatus, and more commonly, are components independent of each other. The processor is configured to execute program code stored in the memory to implement the method in embodiments of this application. In a specific implementation, the memory may also be integrated into the processor, or independent of the processor.

Figure 9:
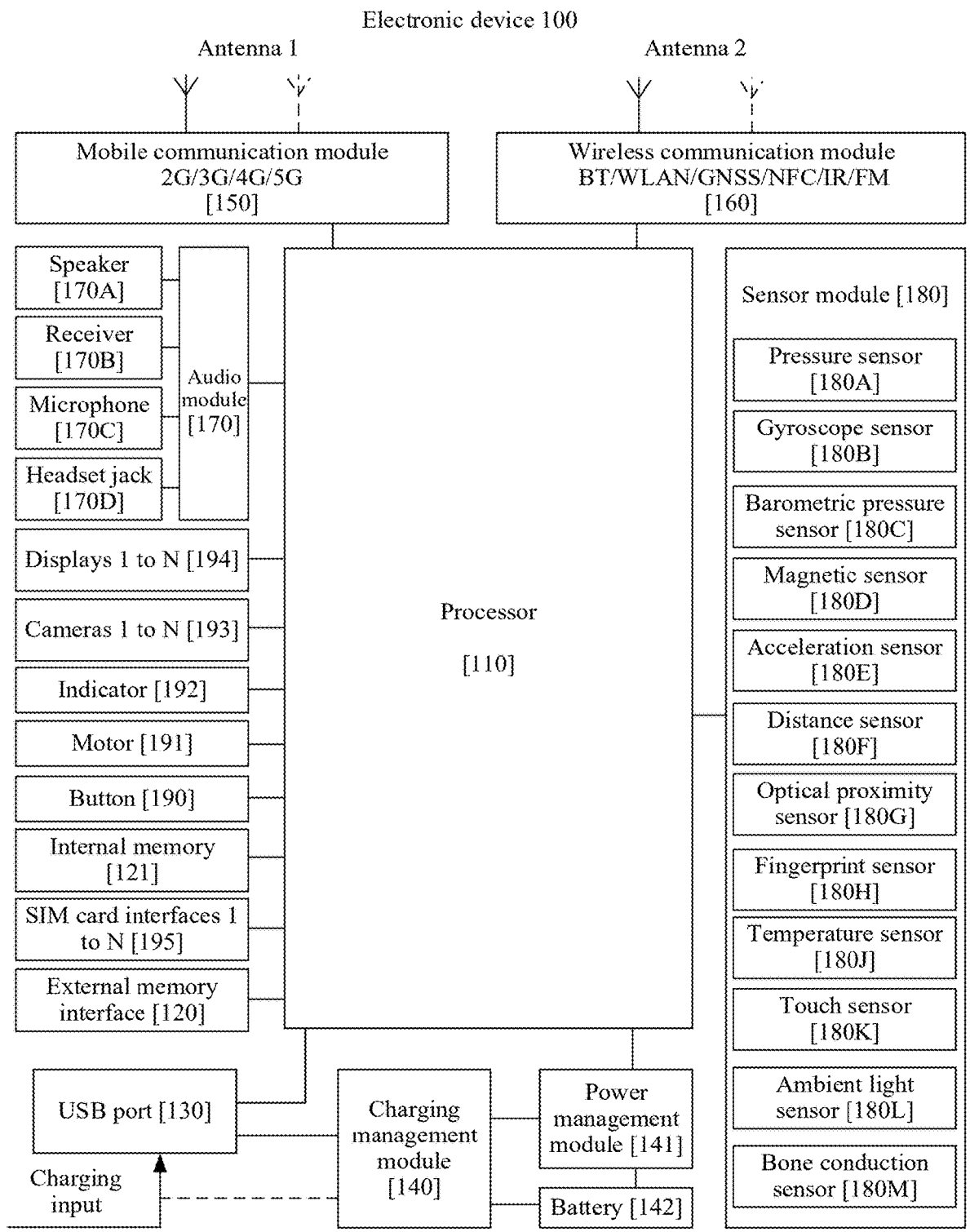
FIG. 9 is a schematic diagram of a device structure of an embodiment of an electronic device according to this application.

Specifically, FIG. 9 is a schematic diagram of a device structure of an embodiment of the electronic device according to this application. In an embodiment of this application, as shown in FIG. 9, the electronic device 100 may include a processor 110, an external memory interface 120, an internal memory 121, a universal serial bus (Universal Serial Bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (Subscriber Identification Module. SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an AP, a modem processor, a GPU, an ISP, a controller, a video codec, a DSP, a baseband processor, and/or an NPU. Different processing units may be independent components, or may be integrated into one or more processors. The controller of the processor 110 may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (Inter-Integrated Circuit, I2C) interface, an inter-integrated circuit sound (Inter-Integrated Circuit Sound, I2S) interface, a pulse code modulation (Pulse Code Modulation, PCM) interface, a universal asynchronous receiver/transmitter (universal asynchronous receiver/transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module. SIM) interface, the USB port 130, and/or the like.

The I2C interface is a two-way synchronization serial bus, and includes one serial data line (Serial Data Line, SDA) and one serial clock line (Serial Clock Line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used to perform asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be used to connect the processor 110 to a peripheral component such as the display 194 or the camera 193. The MIPI interface includes a camera serial interface (Camera Serial Interface, CSI), a display serial interface (Display Serial Interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be used to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB type-C port, or the like. The USB port 130 may be used to connect to the charger to charge the electronic device 100, or may be used to transmit data between the electronic device 100 and a peripheral device, or may be used to connect to a headset for playing audio through the headset. The interface may be further used to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G, 3G, 4G, 5G, and the like. The mobile communication module 150 may include at least one filter, a switch, a power amplifier, a low noise amplifier (Low Noise Amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (Wireless Local Area Network, WLAN) (for example, a wireless fidelity (Wireless Fidelity, Wi-Fi) network). Bluetooth (Bluetooth, BT), a global navigation satellite system (Global Navigation Satellite System, GNSS), frequency modulation (Frequency Modulation. FM), a near field communication (Near Field Communication, NFC) technology, an infrared (Infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (Global System For Mobile Communications. GSM), a general packet radio service (General Packet Radio Service, GPRS), code division multiple access (Code Division Multiple Access, CDMA), wideband code division multiple access (Wideband Code Division Multiple Access, WCDMA), time-division code division multiple access (Time-Division Code Division Multiple Access, TD-SCDMA), long term evolution (Long Term Evolution, LTE), the BT, the GNSS, the WLAN, the NFC, the FM, the IR technology, and/or the like. The GNSS may include a global positioning system (Global Positioning System, GPS), a global navigation satellite system (Global Navigation Satellite System, GLONASS), a BeiDou navigation satellite system (BeiDou Navigation Satellite System, BDS), a quasi-zenith satellite system (Quasi-Zenith Satellite System, QZSS), and/or a satellite based augmentation system (Satellite Based Augmentation System. SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (Liquid Crystal Display, LCD), an organic light-emitting diode (Organic Light-Emitting Diode, OLED), an active-matrix organic light-emitting diode (Active-Matrix Organic Light Emitting Diode, AMOLED), a flexible light-emitting diode (Flex Light-Emitting Diode, FLED), a mini-LED, a micro-LED, a micro-OLED, a quantum dot light emitting diode (Quantum Dot Light Emitting Diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor and the like.

The ISP is configured to process data fed back by the camera 193. For example, during photographing, a shutter is pressed, and light is transferred to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (Moving Picture Experts Group, MPEG)-1, MPEG-2, MPEG-3, and MPEG-4.

The NPU is a neural-network (Neural-Network, NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer executable program code, where the executable program code includes instructions. The internal memory 121 may include a program storage area and a data storage area. The program storage area may store an operating system, an application program required by at least one function (for example, a sound playing function or an image playing function), and the like. The data storage area may store data (for example, audio data and an address book) and the like created when the electronic device 100 is used. In addition, the internal memory 121 may include a high-speed random access memory, or may include a nonvolatile memory, for example, at least one magnetic disk storage device, a flash memory, or a universal flash storage (Universal Flash Storage, UFS). The processor 110 runs the instructions stored in the internal memory 121 and/or the instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (Open Mobile Terminal Platform, OMTP) standard interface or cellular telecommunications industry association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change in the capacitance. When a touch operation is performed on the display 194, the electronic device 100 detects touch operation intensity by using the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor 180B may be configured to determine a moving posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a flip cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 1803 is configured to detect a temperature. In some embodiments, the electronic device 100 executes a temperature processing policy through the temperature detected by the temperature sensor 180J. For example, when the temperature reported by the temperature sensor 1803 exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

It should be understood that the electronic device 900 shown in FIG. 32 can implement the processes in the method provided in embodiments of this application. Operations and/or functions of the modules of the electronic device 900 are separately intended to implement corresponding processes in the foregoing method embodiments. For details, refer to the descriptions in the method embodiments in embodiments of this application. To avoid repetition, detailed descriptions are properly omitted herein.

A software system of the electronic device 100 may use a layered architecture, an event-driven architecture, a microkernel architecture, a micro service architecture, or a cloud architecture. In this embodiment of the present invention, an Android system of a layered architecture is used as an example to illustrate the software structure of the electronic device 100.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

Figure 10:
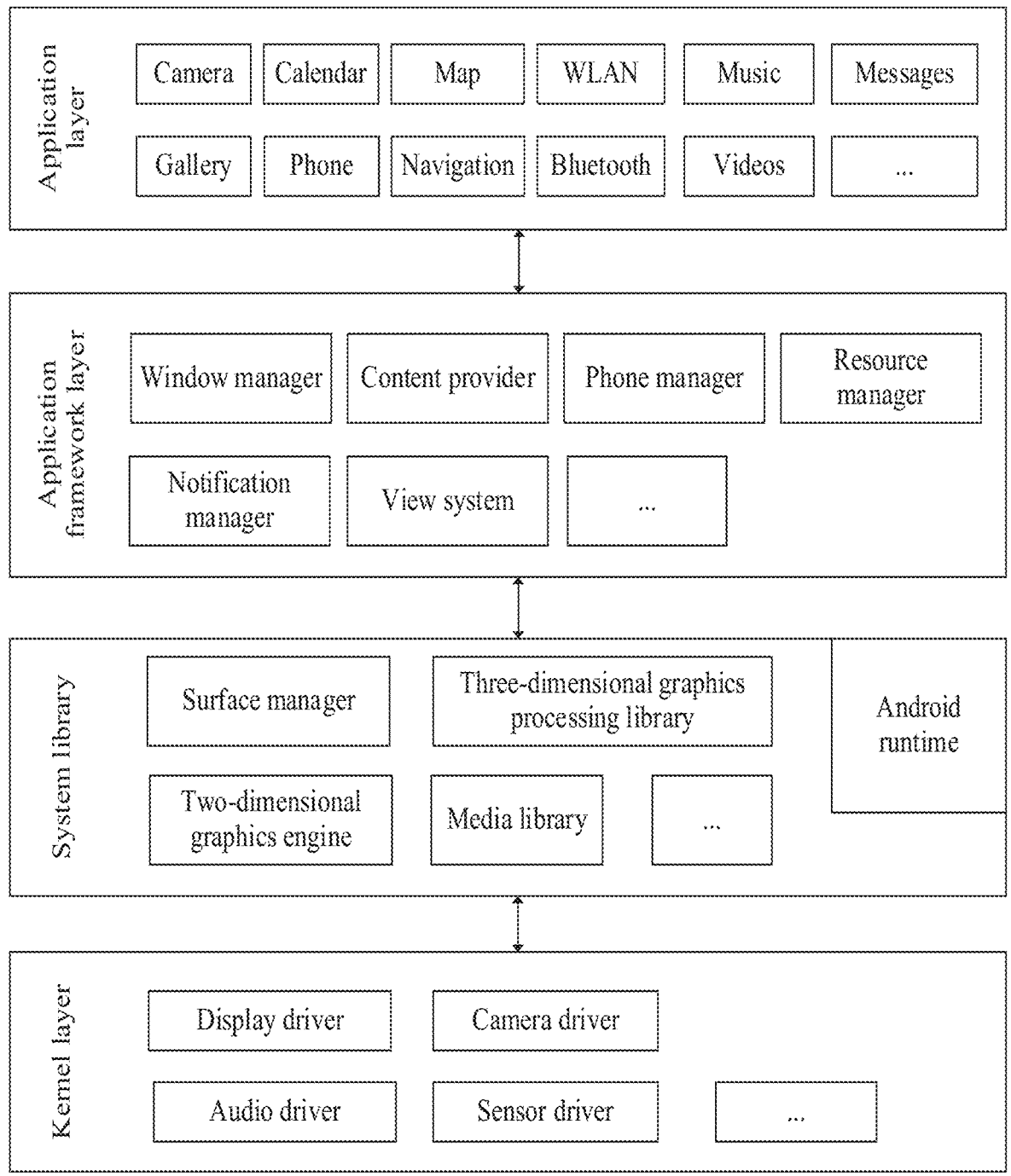
FIG. 10 is a block diagram of a software structure of an electronic device according to an embodiment of this application.

FIG. 10 is a block diagram of the software structure of the electronic device according to an embodiment of this application. As shown in FIG. 10, the application packages may include applications such as Camera. Gallery, Calendar, Phone, Map, Navigation, WLAN, Bluetooth. Music, Videos, and SMS Messages.

The application framework layer provides an application programming interface (application programming interface, API) and a programming framework for an application at the application layer. The application framework layer includes some predefined functions.

As shown in FIG. 10, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying an image. The view system may be configured to construct an application. A display interface may include one or more views. For example, a display interface including an SMS message notification icon may include a view for displaying a text and a view for displaying an image.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a core library and a virtual machine. The Android runtime is responsible for scheduling and management of an Android system.

The core library includes two parts, a function that needs to be invoked in Java language, and a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. A camera application invokes an interface of the application framework layer to enable the camera application, so that the camera driver is enabled by invoking the kernel layer, and a static image or a video is captured through the camera 193.

A person skilled in the art should understand that embodiments of this application may be provided as a method, an apparatus, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media that include computer-usable program code.

In embodiments of this application, when any of the functions are implemented in a form of a software functional unit and sold or used as an independent product, the functions may be stored in a computer-readable storage medium.

Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application.

Specifically, an embodiment of this application further provides a computer-readable storage medium. The computer-readable storage medium stores a computer program, and when the computer program is run on a computer, the computer is enabled to perform the method provided in embodiments of this application.

An embodiment of this application further provides a computer program product. The computer program product includes a computer program. When the computer program is run on a computer, the computer is enabled to perform the method provided in embodiments of this application.

Embodiments of this application is described with reference to the flowcharts and/or block diagrams of the method, the device (apparatus), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

It should be noted that, in embodiments of this application, "at least one" means one or more, and "a plurality of" means two or more. The term "and/or" describes an association relationship between associated objects and indicates that three relationships may exist. For example, A and/or B may indicate the following three cases. Only A exists, both A and B exist, and only B exists. A and B may be in a singular form or a plural form. The character "/" generally indicates an "or" relationship between the associated objects. "At least one of the following items" and a similar expression refer to any combination of these items, including a single item or any combination of a plurality of items. For example, at least one of a, b, and c may indicate a, b, c, a and b, a and c, b and c, or a, b, and c, where a, b, and c may be singular or plural.

In embodiments of this application, the terms "include" or any other variant thereof is intended to cover a non-exclusive inclusion, so that a process, a method, a commodity, or a device that includes a list of elements not only includes those elements but also includes other elements that are not expressly listed, or further includes elements inherent to such a process, method, commodity, or device. An element preceded by "includes a . . . " does not, without more constraints, preclude the existence of additional identical elements in the process, method, commodity, or device that includes the element.

This application can be described in the general context of computer executable instructions executed by a computer, for example, a program module. Generally, the program module includes a routine, program, object, component, data structure, and the like for executing a particular task or implementing a particular abstract data type. This application may be practiced in distributed computing environments in which tasks are performed by remote processing devices that are connected through a communication network. In a distributed computing environment, program modules may be located in both local and remote computer storage media including storage devices.

Embodiments in this application are all described in a progressive manner, for same or similar parts in embodiments, refer to these embodiments, and each embodiment focuses on a difference from other embodiments. Especially, an apparatus embodiment is basically similar to a method embodiment, and therefore is described briefly: for related parts, refer to partial descriptions in the method embodiment.

A person of ordinary skill in the art may be aware that units and algorithm steps described in embodiments of this application may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus, apparatus and unit, refer to a corresponding process in the foregoing method embodiments, and details are not described herein again.

The foregoing descriptions are merely specific implementations of embodiments of this application. Any variation or replacement readily figured out by a person skilled in the art within the technical scope disclosed in this application shall fall within the protection scope of this application. The protection scope of this application shall be subject to the protection scope of the claims.

What is claimed is:
1. A method implemented by a foldable device, the method comprising:
obtaining a folding status parameter that indicates a folding extent of a foldable device comprising a first sensor;

generating corresponding sensor adjustment policies for different folding status parameters by:
  identifying a data change amount or a data change range due to a first interference in first sensor data corresponding to the different folding status parameters, wherein a component of the foldable device in a folded state causes the first interference to the first sensor compared with the foldable device in a non-folded state; and
  setting a sensor adjustment based on the data change amount or the data change range;
invoking the sensor adjustment corresponding to the folding status parameter; and
performing an adjustment operation on the first sensor according to the sensor adjustment by:
  adjusting a sensor operating parameter of the first sensor; or
  performing data preprocessing on the first sensor data collected by the first sensor.

2. The method of claim 1, wherein the sensor adjustment is set to perform a correction calculation on the first sensor data, based on the data change amount or the data change range, to at least partially eliminate the data change amount or the data change range.

3. The method of claim 1, wherein the method further comprises:
  obtaining a first collected data grading policy for the first sensor in the non-folded state, wherein the first collected data grading policy comprises a first collected data grading threshold;
  identifying, based on the first collected data grading threshold and the data change amount or the data change range, second collected data grading thresholds corresponding to the different folding status parameters;
  establishing, based on the second collected data grading thresholds, second collected data grading policies corresponding to the different folding status parameters; and
  setting the sensor adjustment to perform a grading operation on the first sensor data, based on the second collected data grading policies, to identify a grade to which the first sensor data belongs.

4. The method of claim 1, wherein the method further comprises:
  separately obtaining, for different sample environments, the first sensor data corresponding to a non-folded state parameter and different folding status parameters in each sample environment;
  comparing, for each sample environment, the first sensor data to generate a comparison result for the sample environment; and
  identifying, based on the comparison result of each sample environment, the data change amount or the data change range.

5. The method of claim 1, wherein the method further comprises:
  parsing out a generation mechanism of the first interference based on a running manner of the first sensor and a folding manner of the foldable device;
  generating a first calculation function, including a parameter variable, based on a parsing result of the generation mechanism, wherein the parameter variable comprises the folding status parameter and comprises the data change amount or the data change range; and
  calculating, based on the first calculation function, the data change amount or the data change range.

6. The method of claim 1, wherein before invoking the sensor adjustment, the method further comprises
  generating corresponding sensor adjustment policies for different folding status parameters by:
    identifying a first performance parameter when the first sensor operates normally when the foldable device is in a non-folded state;
    identifying, for the first sensor, first sensor operating parameters corresponding to the different folding status parameters that maintain the first performance parameter under an impact of the first interference; and
    setting the sensor adjustment to adjust a sensor operating parameter of the first sensor based on the folding status parameter.

7. The method of claim 1, wherein the folding status parameter comprises a folding extent grade corresponding to a folding angle range, and wherein the method further comprises:
  obtaining a current folding angle of the foldable device; and
  identifying, based on a preset angle range threshold, the folding extent grade to which the current folding angle belongs.

8. The method of claim 1, wherein the method further comprises:
  monitoring a folding status of the foldable device;
  detecting whether the folding status changes; and
  obtaining the folding status parameter when the folding status of the foldable device changes.

9. An apparatus for a foldable device, the apparatus comprising:
  a first sensor configured to collect first sensor data;
  one or more processors; and
  a non-transitory memory coupled to the one or more processors and configured to store instructions that, when executed by the one or more processors, cause the apparatus to be configured to:
    obtain a folding status parameter to indicate a folding extent of the foldable device;
    invoke a sensor adjustment corresponding to the folding status parameter; and
    perform an adjustment operation on the first sensor according to the sensor adjustment to at least partially eliminate impact of a first interference to the first sensor caused by a component of the foldable device when the foldable device is in a folded state by:
      adjusting a sensor operating parameter of the first sensor; or
      performing data preprocessing on the first sensor data.

10. The apparatus of claim 9, wherein the instructions, when executed by the one or more processors, cause the apparatus to be further configured to generate corresponding sensor adjustment policies for different folding status parameters by:
  identifying a data change amount or a data change range due to the first interference in the first sensor data corresponding to the different folding status parameters; and
  setting the sensor adjustment based on the data change amount or the data change range.

11. The apparatus of claim 10, wherein the instructions, when executed by the one or more processors, cause the apparatus to be further configured to set the sensor adjustment to perform a correction calculation on the first sensor data, based on the data change amount or the data change range, to at least partially eliminate the data change amount or the data change range.

12. The apparatus of claim 10, wherein the instructions, when executed by the one or more processors, cause the apparatus to be further configured to:
   obtain a first collected data grading policy for the first sensor when the foldable device is in a non-folded state, wherein the first collected data grading policy comprises a first collected data grading threshold;
   identify, based on the first collected data grading threshold and the data change amount or the data change range, second collected data grading thresholds corresponding to the different folding status parameters;
   establish, based on the second collected data grading thresholds, second collected data grading policies corresponding to the different folding status parameters; and
   set the sensor adjustment to perform a grading operation on the first sensor data, based on the second collected data grading policies, to identify a grade to which the first sensor data belongs.

13. The apparatus of claim 10, wherein the instructions, when executed by the one or more processors, cause the apparatus to be further configured to:
   separately obtain, for different sample environments, the first sensor data corresponding to a non-folded state parameter and different folding status parameters in each sample environment;
   compare, for each sample environment, the first sensor data to generate a comparison result for the sample environment; and
   identify, based on the comparison result of each sample environment, the data change amount or the data change range.

14. The apparatus of claim 10, wherein the instructions, when executed by the one or more processors, cause the apparatus to be further configured to:
   parse out a generation mechanism of the first interference based on a running manner of the first sensor and a folding manner of the foldable device;
   generate a first calculation function, including a parameter variable, based on a parsing result of the generation mechanism, wherein the parameter variable comprises the folding status parameter and comprises the data change amount or the data change range; and
   calculate, based on the first calculation function, the data change amount or the data change range.

15. The apparatus of claim 9, wherein the instructions, when executed by the one or more processors, cause the apparatus to be further configured to generate corresponding sensor adjustment policies for different folding status parameters by:
   identifying a first performance parameter when the first sensor operates normally when the foldable device is in a non-folded state;
   identifying first sensor operating parameters corresponding to the different folding status parameters, wherein the first sensor maintains the first performance parameter under an impact of the first interference based on the first sensor operating parameters; and
   adjusting the sensor operating parameter of the first sensor based on the folding status parameter.

16. The apparatus of claim 9, wherein the folding status parameter comprises a folding extent grade corresponding to a folding angle range, and wherein the instructions, when executed by the one or more processors, cause the apparatus to be further configured to:
   obtain a current folding angle of the foldable device; and
   identify, based on a preset angle range threshold, the folding extent grade to which the current folding angle belongs.

17. The apparatus of claim 9, wherein the instructions, when executed by the one or more processors, cause the apparatus to be further configured to:
   monitor a folding status of the foldable device;
   detect whether the folding status changes; and
   obtain, when the folding status changes, the folding status parameter.

18. An electronic device, wherein the electronic device comprises:
   one or more processors; and
   a non-transitory memory coupled to the one or more processors and configured to store instructions that, when executed by the one or more processors, cause the electronic device to be configured to:
      obtain a folding status parameter to indicate a folding extent of the electronic device comprising a first sensor;
      generate corresponding sensor adjustment policies for different folding status parameters by:
         identifying a data change amount or a data change range due to a first interference in first sensor data corresponding to the different folding status parameters, wherein a component of the electronic device in a folded state causes the first interference to the first sensor compared with the electronic device in a non-folded state; and
         setting a sensor adjustment based on the data change amount or the data change range;
      invoke the sensor adjustment corresponding to the folding status parameter; and
      perform an adjustment operation on the first sensor according to the sensor adjustment by:
         adjusting a sensor operating parameter of the first sensor; or
         performing data preprocessing on the first sensor data collected by the first sensor.

19. The electronic device of claim 18, wherein the sensor adjustment is set to perform a correction calculation on the first sensor data, based on the data change amount or the data change range, to at least partially eliminate the data change amount or the data change range.

20. The electronic device of claim 18, wherein the instructions, when executed by the one or more processors, further cause the electronic device to be configured to:
   obtain a first collected data grading policy for the first sensor in the non-folded state, wherein the first collected data grading policy comprises a first collected data grading threshold;
   identify, based on the first collected data grading threshold and the data change amount or the data change range, second collected data grading thresholds corresponding to the different folding status parameters;
   establish, based on the second collected data grading thresholds, second collected data grading policies corresponding to the different folding status parameters; and
   set the sensor adjustment to perform a grading operation on the first sensor data, based on the second collected data grading policies, to identify a grade to which the first sensor data belongs.

* * * * *